(12) United States Patent
Zhang et al.

(10) Patent No.: US 11,529,697 B2
(45) Date of Patent: Dec. 20, 2022

(54) ADDITIVE MANUFACTURING USING ALUMINUM-CONTAINING WIRE

(71) Applicant: Lincoln Global, Inc., Santa Fe Springs, CA (US)

(72) Inventors: Shenjia Zhang, Zionsville, IN (US); John Benjamin Schaeffer, Rocky River, OH (US); Badri K. Narayanan, Highland Heights, OH (US); Michael A. Kottman, Cleveland, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 361 days.

(21) Appl. No.: 16/148,936

(22) Filed: Oct. 1, 2018

(65) Prior Publication Data

US 2019/0099822 A1    Apr. 4, 2019

Related U.S. Application Data

(63) Continuation-in-part of application No. 15/720,895, filed on Sep. 29, 2017.

(51) Int. Cl.
B23K 9/04     (2006.01)
B23K 10/02    (2006.01)
(Continued)

(52) U.S. Cl.
CPC ............ *B23K 9/044* (2013.01); *B23K 9/1093* (2013.01); *B23K 9/173* (2013.01); *B23K 9/23* (2013.01);
(Continued)

(58) Field of Classification Search
CPC .... B23K 26/348; B23K 9/044; B23K 9/1093; B23K 26/0006; B23K 26/342;
(Continued)

(56) References Cited

U.S. PATENT DOCUMENTS 2,721,249 A * 10/1955 Landis .................. B23K 9/186
                                                 219/137 R
3,177,340 A *  4/1965 Danhier ............. B23K 35/3053
                                                 219/146.52
(Continued)

FOREIGN PATENT DOCUMENTS

CN    101559546 A    10/2009
CN    104708227 A     6/2015
(Continued)

OTHER PUBLICATIONS

Babu, S.S. et al. "Modeling Microstructure Development in Self-Shielded Flux Cored Arc Welds," Supplement to the Welding Journal, Welding Research, 7 pages, Apr. 2001.
(Continued)

*Primary Examiner* — Eric S Stapleton
(74) *Attorney, Agent, or Firm* — Knobbe Martens

(57) ABSTRACT

The disclosed technology generally relates to consumable electrode wires and more particularly to consumable electrode wires having a core-shell structure, where the core comprises aluminum. In one aspect, a welding wire comprises a sheath having a steel composition and a core surrounded by the sheath. The core comprises aluminum (Al) at a concentration between about 3 weight % and about 20 weight % on the basis of the total weight of the welding wire, where Al is in an elemental form or is alloyed with a different metal element. The disclosed technology also relates to welding methods and systems adapted for using the aluminum-comprising electrode wires.

23 Claims, 15 Drawing Sheets

(51) Int. Cl.

| | |
|---|---|
| *B23K 26/342* | (2014.01) |
| *B23K 26/348* | (2014.01) |
| *B23K 9/10* | (2006.01) |
| *B23K 9/173* | (2006.01) |
| *B23K 26/00* | (2014.01) |
| *B23K 9/23* | (2006.01) |
| *B23K 28/02* | (2014.01) |
| B23K 103/20 | (2006.01) |
| B33Y 10/00 | (2015.01) |
| B33Y 70/00 | (2020.01) |
| B23K 103/10 | (2006.01) |

(52) U.S. Cl.
CPC ........ *B23K 10/027* (2013.01); *B23K 26/0006* (2013.01); *B23K 26/342* (2015.10); *B23K 26/348* (2015.10); *B23K 28/02* (2013.01); *B23K 2103/10* (2018.08); *B23K 2103/20* (2018.08); *B33Y 10/00* (2014.12); *B33Y 70/00* (2014.12)

(58) Field of Classification Search
CPC .......... B23K 9/173; B23K 28/02; B23K 9/23; B23K 10/027; B23K 2103/20; B23K 2103/10; B33Y 10/00; B33Y 70/00
USPC ...................................................... 219/146.1
See application file for complete search history.

(56) References Cited

U.S. PATENT DOCUMENTS

| | | | | | |
|---|---|---|---|---|---|
| 4,017,711 | A * | 4/1977 | Honma | ............... | B23K 35/3073 219/145.23 |
| 4,149,063 | A * | 4/1979 | Bishel | ................. | B23K 35/304 219/137 WM |
| 4,999,479 | A * | 3/1991 | Paton | ................. | B23K 35/0261 219/145.22 |
| 5,015,823 | A | 5/1991 | Crockett et al. | | |
| 5,118,919 | A * | 6/1992 | Chai | ................. | B23K 35/3073 219/137 WM |
| 5,120,931 | A * | 6/1992 | Kotecki | ............... | B23K 35/308 219/146.22 |
| 5,132,514 | A * | 7/1992 | Chai | ................. | B23K 35/3605 219/145.22 |
| 5,225,661 | A * | 7/1993 | Chai | ................. | B23K 35/3605 219/137 WM |
| 5,233,160 | A * | 8/1993 | Gordish | ............... | B23K 35/368 219/137 WM |
| 5,365,036 | A * | 11/1994 | Crockett | ............. | B23K 35/368 219/137 WM |
| 5,762,727 | A * | 6/1998 | Crawmer | ............ | B23K 9/044 148/524 |
| 5,857,141 | A * | 1/1999 | Keegan | ............. | B23K 35/0266 428/560 |
| 6,051,810 | A * | 4/2000 | Stava | ................. | B23K 9/0286 219/130.33 |
| 6,127,644 | A * | 10/2000 | Singh | ..................... | B23K 9/048 219/73.11 |
| 6,428,596 | B1 * | 8/2002 | Urevich | ................ | B22F 1/0014 419/14 |
| 6,513,728 | B1 * | 2/2003 | Hughes | ................ | C23C 4/131 219/121.47 |
| 6,608,284 | B1 * | 8/2003 | Nikodym | ............ | B23K 35/3053 219/137 WM |
| 6,674,047 | B1 * | 1/2004 | Hughes | ................ | B23K 35/0266 219/145.22 |
| 6,787,736 | B1 * | 9/2004 | Chen | ................. | B23K 35/0266 219/145.1 |
| 7,863,538 | B2 * | 1/2011 | Barhorst | ................ | B23K 9/173 219/74 |
| 8,191,348 | B2 * | 6/2012 | Barguet | ................ | D07B 1/062 57/223 |
| 8,653,417 | B2 * | 2/2014 | Peters | ................ | B23K 9/0671 219/137.61 |
| 8,704,136 | B2 * | 4/2014 | Posch | ................ | B66C 23/54 219/146.31 |
| 9,149,891 | B2 * | 10/2015 | Rajan | ................ | B23K 35/0266 |
| 9,527,152 | B2 * | 12/2016 | Hutchison | .......... | B23K 35/0244 |
| 9,604,315 | B2 * | 3/2017 | Amata | ................ | B23K 35/38 |
| 9,808,886 | B2 * | 11/2017 | Peters | ................ | B23K 15/0046 |
| 9,833,862 | B2 * | 12/2017 | Denney | ................ | B23K 26/14 |
| 9,839,978 | B2 * | 12/2017 | Narayanan | ......... | B23K 26/1423 |
| 9,844,838 | B2 * | 12/2017 | Barhorst | ............ | B23K 35/0244 |
| 9,937,580 | B2 * | 4/2018 | Peters | ...................... | B23K 9/09 |
| 9,999,944 | B2 * | 6/2018 | Barhorst | ................ | B23K 35/38 |
| 2003/0098296 | A1 * | 5/2003 | Keegan | ................ | B23K 35/286 219/145.22 |
| 2004/0020912 | A1 * | 2/2004 | Hara | ................ | B23K 35/3053 219/145.22 |
| 2005/0257853 | A1 * | 11/2005 | Yamashita | ............... | C22C 38/04 148/26 |
| 2006/0201587 | A1 * | 9/2006 | Amaya | ................... | C22C 38/06 148/325 |
| 2007/0012673 | A1 * | 1/2007 | Narayanan | ........... | B23K 35/368 219/137 R |
| 2007/0051702 | A1 * | 3/2007 | James | ................ | B23K 9/0061 219/73 |
| 2007/0164088 | A1 * | 7/2007 | Dianatkhah | .......... | B23K 35/361 228/183 |
| 2007/0181549 | A1 * | 8/2007 | Hartman | ............ | B23K 35/3053 219/137 WM |
| 2007/0253857 | A1 * | 11/2007 | Okazaki | ................ | C22C 38/04 420/106 |
| 2007/0289686 | A1 * | 12/2007 | Sasabe | ................ | C22C 38/04 152/539 |
| 2008/0006612 | A1 * | 1/2008 | Peters | ...................... | B23K 9/04 219/76.14 |
| 2008/0093350 | A1 * | 4/2008 | Ma | ................ | B23K 35/0227 219/145.1 |
| 2010/0059572 | A1 * | 3/2010 | Sassatelli | ............... | B23K 9/044 228/119 |
| 2010/0200143 | A1 * | 8/2010 | Okamoto | ............... | B29D 30/48 152/539 |
| 2010/0227196 | A1 * | 9/2010 | Narayanan | ............... | C22C 38/06 428/683 |
| 2012/0279629 | A1 * | 11/2012 | Barguet | ................ | D07B 1/0633 152/556 |
| 2013/0028782 | A1 * | 1/2013 | Nako | ...................... | C22C 38/42 420/91 |
| 2013/0094900 | A1 * | 4/2013 | Folkmann | ............ | C22C 33/0257 403/343 |
| 2013/0292362 | A1 * | 11/2013 | Fairchild | ............ | B23K 35/3053 219/74 |
| 2013/0294820 | A1 * | 11/2013 | Wallin | ................ | B23K 35/365 403/270 |
| 2013/0327749 | A1 * | 12/2013 | Denney | ............ | B23K 35/0261 219/137 PS |
| 2014/0021188 | A1 * | 1/2014 | Denney | ............ | B23K 35/0261 219/146.31 |
| 2014/0251974 | A1 * | 9/2014 | Wang | ................ | B23K 35/362 219/145.22 |
| 2014/0263259 | A1 * | 9/2014 | Narayanan | ........... | B23K 35/362 219/145.22 |
| 2014/0332517 | A1 | 11/2014 | Barhorst et al. | | |
| 2015/0129559 | A1 * | 5/2015 | Fairchild | ................ | C22C 38/08 219/73 |
| 2015/0283638 | A1 | 10/2015 | Henry | | |
| 2015/0314400 | A1 * | 11/2015 | Nako | ...................... | C22C 38/46 420/91 |
| 2016/0023439 | A1 * | 1/2016 | Zhao | ........................ | C22F 1/10 428/662 |
| 2016/0167009 | A1 * | 6/2016 | Chun | ........................ | C01B 3/34 252/373 |
| 2016/0201155 | A1 * | 7/2016 | Niendorf | ................ | C22C 38/30 420/72 |
| 2016/0243638 | A1 * | 8/2016 | Berube | ................ | B23K 9/173 |
| 2016/0243656 | A1 | 8/2016 | Berube et al. | | |

(56) References Cited

U.S. PATENT DOCUMENTS

| | | | |
|---|---|---|---|
| 2016/0271736 A1* | 9/2016 | Han | B23K 35/24 |
| 2016/0279742 A1* | 9/2016 | Lee | B23K 35/3073 |
| 2016/0333450 A1* | 11/2016 | Ikeda | C22C 38/02 |

FOREIGN PATENT DOCUMENTS

| | | |
|---|---|---|
| CN | 105798485 A | 7/2016 |
| CN | 105921912 A | 9/2016 |
| DE | 37 43 1 67 A1 | 6/1989 |
| DE | 20 2013 012 169 U1 | 10/2015 |
| EP | 3 031 568 A1 | 6/2016 |
| EP | 3 078 447 A1 | 10/2016 |
| GB | 2 155 045 A | 9/1985 |
| JP | S61-169196 A | 7/1986 |
| JP | H05-237693 A | 9/1993 |
| KR | 10-2013-0003686 A | 1/2013 |
| KR | 10-1220559 B1 | 1/2013 |
| RU | 2 594 919 C2 | 8/2016 |

OTHER PUBLICATIONS

Babu, S.S. et al. "TRXRD Observations of Microstructural Evolution in Self-Shielded Flux Cored Arc Weld Deposits", 3 pages.

Ding et al., "Fabricating Superior NiAl Bronze Components through Wire Arc Additive Manufacturing", MDPI: Materials 2016, 9, 652, dated Aug. 3, 2016, pp. 1-12.

Ding et al., "Wire-feed additive manufacturing of metal components: technologies, developments and future interests", International Journal of Advanced Manufacturing Technology—May 2015 (uploaded May 9, 2015), pp. 1-18.

Es-Souni, M. et al. "Microstructure and AEM Studies of Self-Shielded Flux Cored Arc Weldments," Supplement to the Welding Journal, Welding Research, 12 pages, Feb. 1992.

Meyers, Tom "Innershield Wire FCAW-S Welding Guide" Lincoln Global Inc., Mar. 2016, 76 pages.

Quintana, M.A. "Inclusion Formation in Self-Shielded Flux Cored Arc Welds" Supplement to the Welding Journal, Welding Research, 8 pages, Apr. 2001.

Renganathan, "A new approach to Wire-Arc based Additive Manufacturing Process", https://medium.com/@sriram_83285/a-new-approach-to-wire-arc-based-additive-manufacturing-process-c7b0fb15b481, dated Aug. 6, 2018, pp. 1-6.

Silva et al., "Additive Manufacturing of Metal Parts by Welding", IFAC—PapersOnline 48-3 (2015), pp. 2318-2322.

Taube, Fabian "Manganese in Occupational Arc Welding Fumes—Aspects on Physiochemical Properties, with Focus on Solubility" Annals of Occupational Hygiene, 20 pages, vol. 57, Oxford University Press, 2012.

"Welding, Failure Analysis, and Metallography," Microstructural Science, vol. 14, 12 pages.

Xu et al., "Process Control for Wire-Arc Additive Manufacturing", Advanced Manufacturing Processes and Systems University of Bath (euspen 2017), pp. 1-21.

Extended European Search Report for European Application No. 18197602.8 dated Nov. 30, 2018.

Banovic, et al.; "The Role of Aluminum on the Weldability and Sulfidation Behavior of Iron-Aluminum Cladding;" American Welding Society Welding Journal; vol. 78, No. 1; Dated Jan. 31, 1999; pp. 1-8.

Miakhamreh, et al.; "Mechanical Properties of Flux Cored Iron-Manganese-Aluminum Weld Metal;" Welding Journal, American Welding Society; vol. 71, No. 3; Dated Mar. 31, 1992; pp. 104-s-113-s.

Extended European Search Report from Corresponding European Application No. 19200876.1; Dated Feb. 21, 2020; pp. 1-10.

\* cited by examiner

ADDITIVE MANUFACTURING USING ALUMINUM-CONTAINING WIRE

CROSS REFERENCE TO RELATED APPLICATIONS

This application is a continuation-in-part of U.S. patent application Ser. No. 15/720,895, filed Sep. 29, 2017, entitled "ALUMINUM-CONTAINING WELDING ELECTRODE," the content of which is incorporated herein by reference in its entirety.

BACKGROUND

Field

The disclosed technology generally relates to consumable welding electrodes wires and more particularly to aluminum-containing consumable electrode wires, and to welding methods and systems adapted for using the aluminum-containing electrode wires.

Description of the Related Art

Various welding technologies, including traditional joining technologies as well as emerging additive manufacturing technologies, utilize welding wires that serves as a source of metal. For example, in metal arc welding, an electric arc is created when a voltage is applied between a consumable weld electrode wire, which serves as one electrode that advances towards a workpiece, and the workpiece, which serves as another electrode. The arc melts a tip of the metal wire, thereby producing droplets of the molten metal wire that deposit onto the workpiece to form a weld bead of a weldment or an article formed by additive manufacturing.

Technological and economic demands on these welding technologies continue to grow in complexity. For example, the need for higher bead quality in both appearance and in mechanical properties continues to grow, including high yield strength, ductility and fracture toughness. Simultaneously, the higher bead quality is often demanded while maintaining economic feasibility. Some welding technologies aim to address these competing demands by improving the consumables, e.g. by improving the physical designs and/or compositions of the electrode wires.

One approach to addressing such competing demands is to incorporate additives into consumable electrodes. An example additive is chromium (Cr), which may be added to improve oxidation/corrosion resistance of the resulting weldment. However, the addition of such additives may be insufficient to simultaneously satisfy a set of competing weldment characteristics, which may include, e.g., resistance to hot cracking and high fracture toughness, in addition to corrosion resistance. In addition, the set of competing weldment properties may need to be satisfied while maintaining economic feasibility, which may be difficult when main additives include relatively expensive elements such as Cr. In the following, various embodiments of consumable welding electrode wires, welding processes and systems capable of satisfying these and other competing characteristics of weldments and additively-manufactured articles, as well as productivity and economic considerations, are described.

SUMMARY

The disclosed technology generally relates to consumable welding electrodes wires and more particularly to aluminum-containing welding consumable electrode wires having a core-shell structure, where the core comprises aluminum. The disclosed technology also relates to methods of welding and additive manufacturing, and systems adapted for the methods using the aluminum-comprising electrode wires.

In a first aspect, a welding wire is configured to serve as a source of weld metal during welding, e.g., flux-cored arc welding (FCAW). The welding wire comprises a sheath having a steel composition and a core surrounded by the sheath. The core comprises aluminum (Al) at a concentration between about 3 weight % and about 20 weight % on the basis of the total weight of the welding wire, where Al is in an elemental form or is alloyed with a different metal element.

In the welding wire of the first aspect, the core further comprises manganese (Mn) at a concentration between about 10 weight % and about 60 weight % on the basis of the total weight of the welding wire, wherein Mn is in an elemental form or is alloyed with a different metal element.

In the welding wire of the first aspect, the welding wire is configured to serve as an electrode in a self-shielded flux-cored arc welding (FCAW-S) process, wherein the core comprises a fluxing agent comprising an oxide of a metal other than Al or Mn or a fluoride of a metal other than Al or Mn.

In the welding wire of the first aspect, the core further comprises one or more of: copper (Cu) at a concentration greater than zero weight % and less than about 10 weight % on the basis of the total weight of the welding wire; and cobalt (Co) at a concentration greater than zero weight % and less than about 10 weight % on the basis of the total weight of the welding wire, wherein a total concentration of the one or more of Cu and Co is greater than zero weight % and less than about 10 weight % on the basis of the total weight of the welding wire.

In the welding wire of the first aspect, the welding wire further comprises one or more of: nickel (Ni) at a concentration greater than zero weight % and less than about 50 weight % on the basis of the total weight of the welding wire; carbon (C) at a concentration greater than zero weight % and less than about 2.5 weight % on the basis of the total weight of the welding wire; and nitrogen (N) at a concentration greater than zero weight % and less than about 2 weight % on the basis of the total weight of the welding wire.

In the welding wire of the first aspect, concentrations of Mn, Ni, C, Ni, Cu and Co are such that that $2[Mn]+[Ni]+30[C]+20[N]+0.3[Cu]+0.3[Co]$ is between about 10 weight %, and about 80 weight %, wherein [Mn], [Ni], [C], [N], [Cu] and [Co] represent weight percentages of respective elements on the basis of the total weight of the welding wire.

In some embodiments, the sheath and the core are configured such that a weld bead formed using the welding wire has aluminum (Al) at a concentration between about 4 weight % and about 6.5 weight % and manganese (Mn) at a concentration between about 15 weight % and about 25 weight %. In some other embodiments, the sheath and the core are configured such that a weld bead formed using the welding wire has a fracture toughness greater than 20 ft-lbs. when measured at a temperature lower than 0° F. In some other embodiments, the sheath and the core are configured such that a weld bead formed using the welding wire has a ferrite number between 1 and 125.

In a second aspect, a welding wire configured to serve as a source of weld metal during welding, e.g., flux-cored arc welding (FCAW), comprises a core surrounded by a sheath and a composition such that a weld bead formed using the welding wire has iron (Fe) at concentration between about 50 weight % and about 85 weight %. and aluminum (Al) at a concentration between about 3 weight % and about 20 weight %.

In the welding wire of the second aspect, the weld bead further comprises manganese (Mn) at a concentration between about 10 weight % and about 60 weight %.

In the welding wire of the second aspect, the welding wire is a self-shielded flux-cored arc welding (FCAW-S) wire, wherein the core comprises a fluxing agent comprising an oxide of a metal other than Al or Mn or a fluoride of a metal other than Al or Mn.

In the welding wire of the second aspect, the core comprises: aluminum (Al) at a concentration between about 8 weight % and about 20 weight % on the basis of the total weight of the welding wire; manganese (Mn) at a concentration between about 30 weight % and about 60 weight % on the basis of the total weight of the welding wire; and nickel (Ni) at a concentration greater than zero weight % and less than about 50 weight % on the basis of the total weight of the welding wire, wherein each of Al, Mn and Ni is in an elemental form or is alloyed with a different metal element.

In the welding wire of the second aspect, the core further comprises carbon (C) and nickel (Ni) such that a weld bead formed using the welding wire has carbon (C) at a concentration greater than 0 weight % and less than about 0.5 weight % and nickel (Ni) at a concentration greater than about 0 weight % and less than about 30 weight %.

In the welding wire of the second aspect, the composition is such that 2[Mn]+[Ni]+30[C]>20 weight %, wherein [Mn], [Ni] and [C] represent weight percentages of respective elements on the basis of the total weight of the weld bead.

In the welding wire of the second aspect, the weld bead has face-centered cubic (FCC) austenite exceeding 30% by volume.

In the welding wire of the second aspect, the welding wire is configured to form the weld bead having the Al concentration and the Mn concentration when deposited without a shielding gas.

In the welding wire of the second aspect, the core further comprises one or more of ferrite-stabilizing elements selected from the group consisting of chromium (Cr), molybdenum (Mo), silicon (Si), titanium (Ti), niobium (Nb), vanadium (V) and tungsten (W) such that the weld bead has a total concentration of the ferrite-stabilizing elements that is greater than 0 weight % and less than about 10 weight %.

In the welding wire of the second aspect, wherein the core further comprises one or more of austenite-stabilizing elements selected from the group consisting of copper (Cu) and cobalt (Co) such that the weld bead has a total concentration of the austenite-stabilizing elements that is greater than 0% and less than about 10 weight %.

In a third aspect, a method of welding, e.g., flux-cored arc welding (FCAW), comprises providing a welding wire configured to serve as a source of weld metal during welding. The welding wire comprises a sheath having a steel composition and a core surrounded by the sheath. The core comprises aluminum (Al) at a concentration between about 3 weight % and about 20 weight % on the basis of the total weight of the welding wire, wherein Al in an elemental form or is alloyed with a different metal element. The method additionally comprises applying sufficient energy to produce a steady stream of droplets of molten welding wire. The method further comprises depositing the molten droplets onto a workpiece.

In the method of the third aspect, the welding wire further comprises manganese (Mn) at a concentration between about 10 weight % and about 60 weight % on the basis of the total weight of the welding wire, wherein Mn is in an elemental form or is alloyed with a different metal element.

In the method of the third aspect, depositing comprises depositing under a self-shielded flux-cored arc-welding (FCAW-S) process without a shielding gas, and wherein applying the energy comprises applying a voltage to the welding wire to generate a plasma arc.

In the method of the third aspect, depositing comprises depositing at an atmosphere and a voltage condition such that a weld bead using the welding wire has aluminum (Al) at a concentration between about 4 weight % and about 6.5 weight % and manganese (Mn) at a concentration between about 15 weight % and about 25 weight %.

In a fourth aspect, a method of fabricating an article by additive manufacturing comprises providing a wire configured to serve as a source of metal that forms at least part of the article. The wire comprises a sheath having a steel composition, and a core surrounded by the sheath. The core comprises aluminum (Al) at a concentration between about 3 weight % and about 20 weight % on the basis of the total weight of the wire, where Al in an elemental form or is alloyed with a different metal element. The method additionally includes applying an energy sufficient to form molten droplets of the metal. The method further includes depositing the molten droplets to form a layer of beads that forms the at least part of the article.

In a fifth aspect, a method of fabricating an article by additive manufacturing comprises providing a wire comprising a core surrounded by a sheath and a composition such that beads formed from molten droplets formed by melting and quenching the wire has iron (Fe) at concentration between about 50 weight % and about 85 weight %. and aluminum (Al) at a concentration between about 3 weight % and about 20 weight % on the basis of a total weight of the beads. The method additionally includes forming a substantial portion of the article using a plurality of layers of the beads.

BRIEF DESCRIPTION OF THE DRAWINGS

FIG. 9B schematically illustrates a system configured for wire-feed additive manufacturing based on gas tungsten arc welding (GTAW) in which an aluminum-containing electrode wire serves as a source of metal, according to embodiments.

DETAILED DESCRIPTION

Various technological and economic demands on welding technologies, including joining technologies as well as emerging additive manufacturing technologies, which are often competing demands, continue to grow in complexity. For example, higher bead quality in terms of both appearance and mechanical properties are often desired without incurring negative economic or productivity consequences, e.g. higher cost of raw material and/or welding. In particular, in steel-based welding, improving or satisfying competing characteristics of mechanical properties such as yield strength, ductility, corrosion resistance, resistance to hot cracking and fracture toughness, may be needed, while maintaining economic feasibility.

Some welding technologies aim to address these competing demands by improving the consumables, e.g. by improving the physical designs and/or compositions of consumable electrode wires. As one example, some traditional consumable electrodes incorporate additives such as chromium (Cr) and nickel (Ni). Chromium and nickel addition to ferrous alloys can provide, e.g., oxidation resistance through the ability to form a protective oxide layer. However, high amounts of Cr and Ni may be undesirable from a cost point of view. In addition, while providing one advantage, some additives may be insufficient in satisfying other characteristics, e.g., competing characteristics, or may introduce undesirable consequences. For example, under some circumstances, while providing oxidation and corrosion resistance, relatively high amounts of Cr and Ni can promote an undesirable amount of body-centered cubic (BCC) ferrite in the resulting weldment, which may lead to undesirable mechanical properties, including lower fracture toughness.

In various embodiments described herein, consumable electrode wires have a core-shell structure, where aluminum is present in particular amounts, e.g., in the core. The electrodes various satisfy competing weldment properties, such as corrosion resistance, resistance to hot cracking and high fracture toughness. In addition, when used in certain welding processes, e.g., flux-cored arc welding, the disclosed electrodes can provide a lower cost solution compared to traditional additives in steel-based welding wires. In the following, various embodiments of aluminum-containing wires and welding processes and systems employing the aluminum-containing wires are disclosed first, followed by methods and systems for additive manufacturing using the aluminum-containing wires. However, it will be understood that the disclosed wires as well as various aspects of systems and methods can be used interchangeably in either or both joining and additive manufacturing technologies.

Welding Processes for Using Aluminum-Containing Welding Electrodes

Figure 1:
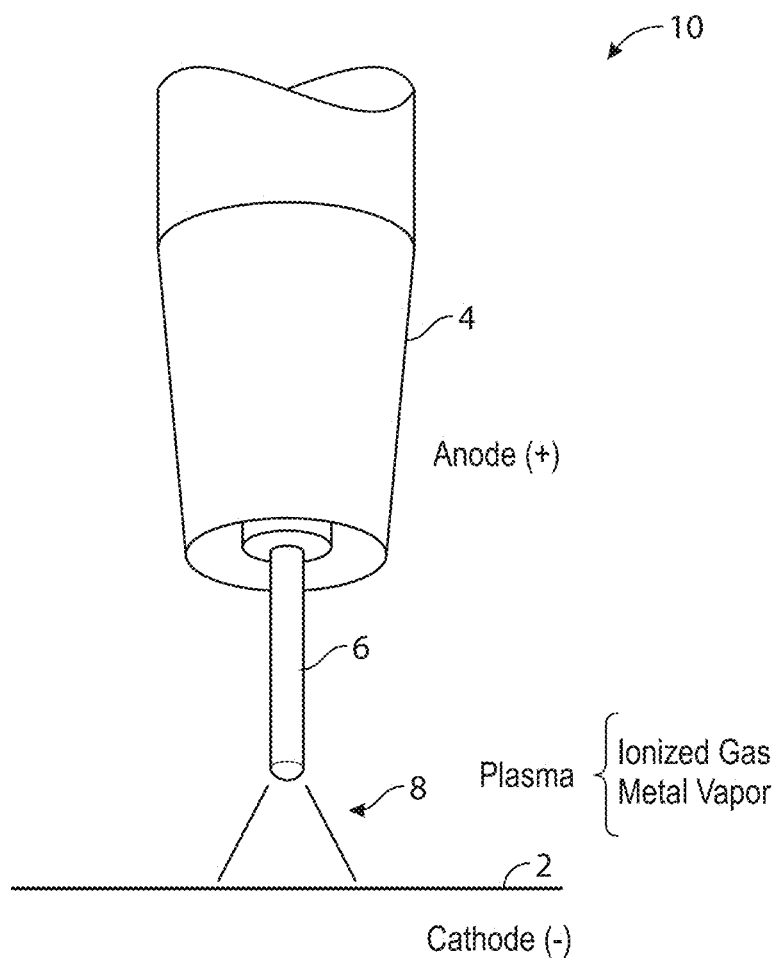
FIG. 1 is a schematic illustration of a configuration of electrodes in a metal arc welding process.

FIG. 1 is a schematic illustration of a configuration of electrodes in metal arc welding processes. In metal arc welding, e.g., gas-metal arc welding (GMAW), an electric arc is created between a consumable metal wire 6, which is electrically connected to one electrode 4 (e.g., anode (+)), and a workpiece 2, which serves as another electrode (e.g., cathode (−)). Thereafter, a plasma 8 is sustained, which contains neutral and ionized gas molecules, as well as neutral and charged clusters or droplets of the material of the metal wire 6 that have been vaporized by the arc. During welding, the consumable metal wire 6 is advanced toward the work piece 2, and the resulting molten droplets of the metal wire 6 deposits onto the workpiece, thereby forming a weld bead.

The metal wire 6 may be a welding wire comprising aluminum (Al) at a concentration between about 4 weight % and about 8 weight % on the basis of the total weight of the metal wire 6, according to various embodiments. In some embodiments, the metal wire 6 comprises a sheath having a steel composition and a core surrounded by the sheath, where the core comprises aluminum (Al) at a concentration between about 4 weight % and about 8 weight % on the basis of the total weight of the welding wire. The metal wire 6 can be used in various arc welding processes, including gas-metal arc welding processes, which may employ either solid electrode wires (GMAW) or metal-cored wires (GMAW-C). The metal wire 6 can also be used in flux-cored arc welding processes (FCAW), which can be gas shielded flux-cored arc welding (FCAW-G) or self-shielded flux-cored arc welding (FCAW-S). The metal wire 6 can further be used in shielded metal arc welding (SMAW) processes and submerged arc welding (SAW) processes, among others. In the following different welding processes that may employ the metal wire 6 are described in more detail.

In gas-metal arc welding using solid (GMAW) or metal-cored electrodes (GMAW-C), a shielding gas is used to provide protection for the weld pool and the weld bead against atmospheric contamination during welding. When solid electrodes are used, they are appropriately alloyed with active ingredients that, in combination with the shielding gas, may be designed to provide low porosity or porosity-free welds with the desired physical and mechanical properties of the resulting weld bead. When metal-cored electrodes are used, some of the active ingredients may be added in the core of a metallic outer sheath, and designed to provide a similar function as in the case of solid electrodes.

Solid and metal-cored electrodes are designed to provide, under appropriate gas shielding, a solid, substantially porosity-free weldment or beads with yield strength, tensile strength, ductility and impact toughness to perform satisfactorily in the final applications. These electrodes may also be designed to minimize the quantity of slag generated during welding. For some applications, metal-cored electrodes can be used as an alternative to solid wires to increase productivity. As described herein, metal-cored electrodes refer to composite electrodes having a core that is at least partially filled and surrounded by a metallic outer sheath. The core can include metal powder and active ingredients to help with arc stability, weld wetting and appearance and desired physical and mechanical properties. The metal-cored electrodes are manufactured by mixing the ingredients of the core material and depositing them inside a formed strip, and then closing and drawing the strip to the final diameter. For some applications, cored electrodes can provide increased deposition rates and a wider, relatively consistent weld penetration profile compared to solid electrodes. As described herein, metal-cored electrodes (GMAW-C) refer to electrodes having a core whose ingredients are primarily metallic. When present, nonmetallic components in the core have a combined concentration less than 5%, 3% or 1%, on the basis of the total weight of each electrode. The relatively low nonmetallic components may distinguish GMAW-C electrodes from flux-cored arc welding electrodes described in more detail, infra. The GMAW-C electrodes can be characterized by a spray arc and high quality weld metal.

Similar to gas-metal arc welding using metal-cored electrodes (GMAW-C), electrodes used in flux-cored arc welding (FCAW, FCAW-S, FCAW-G) also include a core surrounded by a shell. That is, the cored electrodes used in flux-cored arc welding have a core that is at least partially filled and surrounded by a metallic outer sheath, similar to metal-cored electrodes described above. However, unlike metal-cored electrodes (GMAW-C), the cored electrodes used in flux-cored arc welding (FCAW) additionally includes fluxing agents designed to provide protection for the weld pool and the weld bead against atmospheric contamination during welding, at least partially in lieu of a shielding gas. The cored electrodes used in flux-cored arc can additionally include other active ingredients to help with arc stability, weld wetting and appearance and desired physical and mechanical properties. In one aspect, flux-cored arc electrodes may be distinguished from metal-cored electrodes by the amount of nonmetallic components present in the core, whose combined concentration can be less than 5%, 3% or 1%, on the basis of the total weight of each electrode.

Figure 2A:
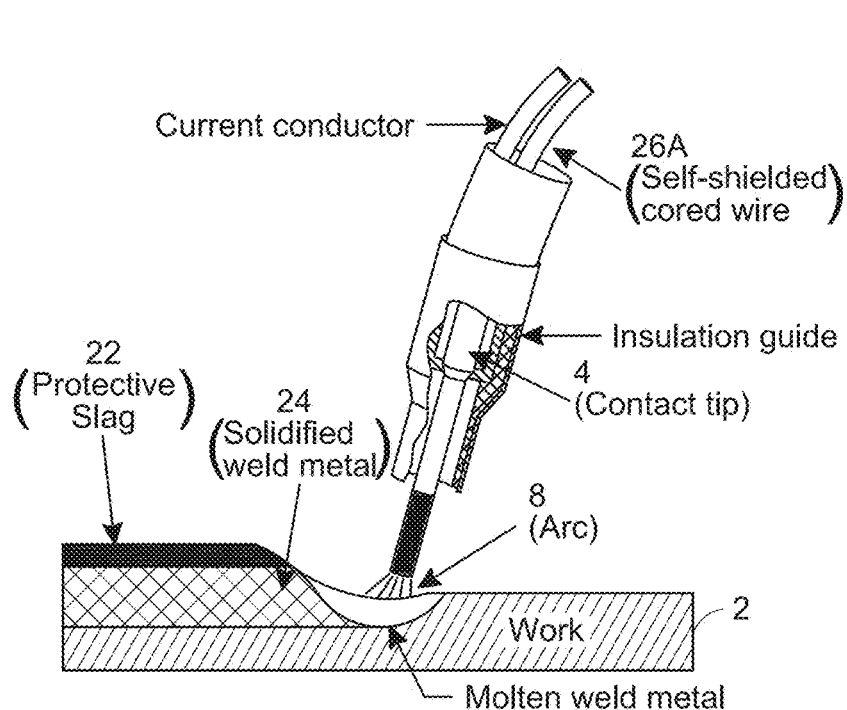
FIG. 2A illustrates a metal arc welding system configured for a self-shielded flux-cored arc welding (FCAW-S), according to embodiments.
Figure 2B:
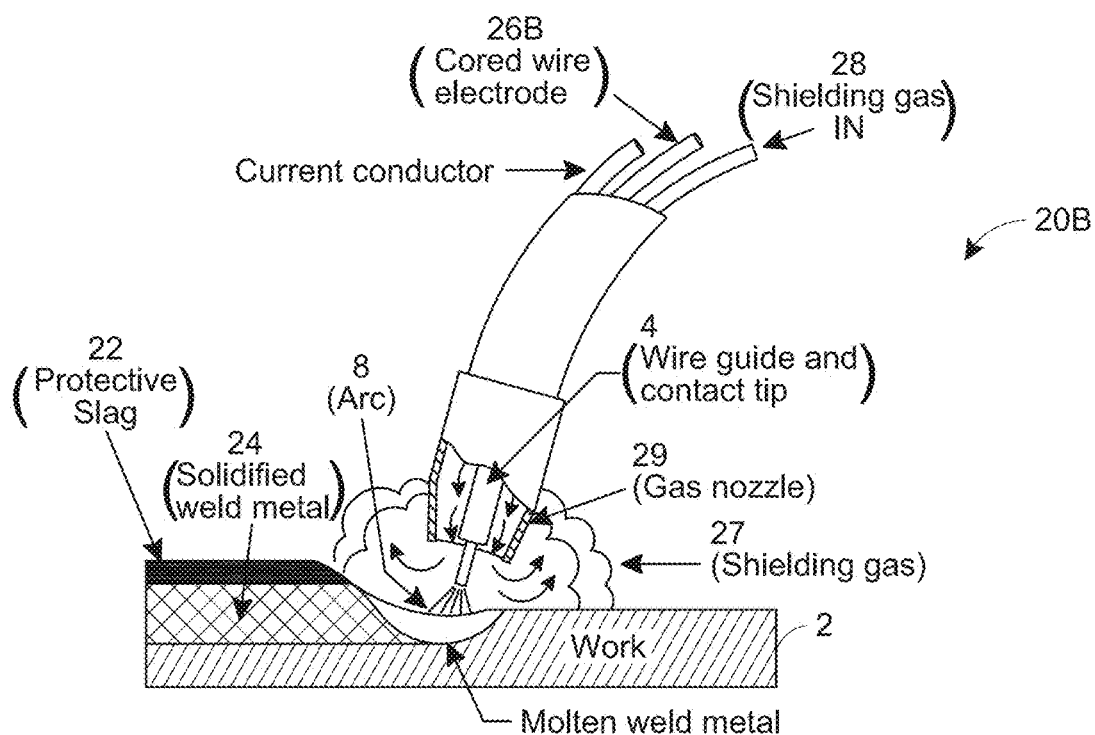
FIG. 2B illustrates a metal arc welding system configured for a gas-shielded flux-cored arc welding (FCAW-G), according to embodiments.

A large number of fluxing agent compositions for flux-cored electrodes have been developed to control the arc stability, modify the weld metal composition, and to provide protection from atmospheric contamination. In flux-cored electrodes, arc stability may be controlled by modifying the composition of the flux. As a result, it may be desirable to have substances which serve well as plasma charge carriers in the flux mixture. In some applications, fluxes can also modify the weld metal composition by rendering impurities in the metal more easily fusible and providing substances with which these impurities may combine. Other materials are sometimes added to lower the slag melting point, to improve slag fluidity, and to serve as binders for the flux particles. Various wires used in FCAW may share some similar characteristics, e.g., forming a protective slag over the weld, using a drag angle technique, having the ability to weld out-of-position or flat and horizontal at higher deposition rates, having the ability to handle relatively higher amount of contaminants on the plate, etc. On the other hand, different types of flux-cored arc welding processes exist, namely: self-shielded flux-cored arc welding (FCAW-S) and gas-shielded flux-cored arc welding (FCAW-G), which are described in more detail below in reference to FIGS. 2A and 2B FIGS. 2A and 2B illustrate systems 20A and 20B configured for a FLAW-S process and a FCAW-G process configured to use the aluminum-containing electrode wires, respectively, according to embodiments. In a FCAW process, a plasma 8 is produced by an electric arc that is created between a FCAW-S wire 26A (FIG. 2A) or a FCAW-G wire 26B (FIG. 2B), which is electrically connected to one electrode 4 (e.g., one of an anode (+) or a cathode (−)), and a workpiece 2, which serves as another electrode (e.g., the other of the anode (+) and the cathode (−)). Thereafter, a plasma 8 is sustained, which contains neutral and ionized gas molecules, as well as neutral and charged clusters or droplets of the material of the metal wire 6 that have been vaporized by the arc. In operation, the FCAW-S wire 26A (FIG. 2A) and the FCAW-G wire 26B (FIG. 2B) advance towards the work piece 2, and the molten droplets from the wires deposit onto the workpiece 2, thereby forming a weld bead or weldment 24 comprising a solidified weld metal. Unlike the FCAW-S system 20A (FIG. 2A), the FCAW-G system 20B also include a shielding gas inlet 28 for supplying a shielding gas 27 for delivery to the plasma region thorough a shielding gas nozzle 27.

Referring to FIG. 2A, FCAW-S processes utilize a protective slag and gases produced from chemical reactions in the arc itself to protect the molten metal from the atmosphere. The flux ingredients in the core of the FCAW-S wire 26A perform multiple functions, including deoxidizing and denitrifying the molten metal, forming a protective slag, which also shapes the bead and can hold molten metal out-of-position, and adding alloying elements to the weld bead 24 to produce desired properties and controllably affecting various welding characteristics (e.g., deep penetration characteristics and high deposition rates), among other functions.

Under some circumstances, FCAW-S processes/systems according to embodiments provide increased productivity compared to other processes, e.g., a stick (i.e., manual) welding, resulting in part from relatively higher deposition rate capabilities with a semi-automatic process for similar or same applications as applications where stick electrodes are used. For example, some FCAW-S are adapted for outdoor welding that does not use external shielding gas, especially where the shielding gas can easily be blown away by wind and result in porosity in the resulting weld bead with gas-shielded processes. However, embodiments are not so limited and other FCAW-S processes can be adapted for indoor welding.

Some FCAW-S processes according to embodiments are performed under a DC− polarity. Some FCAW-S processes according to embodiments have a globular arc transfer, ranging from fine droplets to large droplets of metal.

Referring to FIG. 2B, FCAW-G processes use both a slag system and an external shielding gas to protect the arc from the atmosphere. Example shielding gases that may be used include carbon dioxide ($CO_2$), e.g., essentially pure $CO_2$ or a mixture of $CO_2$ and inert gas, e.g., 75-85% argon (Ar) combined with a balance of $CO_2$. Similar to FCAW-S wires, the core ingredients of FCAW-G wires may be configured to produce a slag, to incorporate alloying elements to the weld bead and to affect the welding characteristics. However, unlike the FCAW-S wires, the FCAW-G wires may derive protection of the molten metal from the atmosphere primarily or essentially through the external shielding gas 27 delivered around the plasma region.

Still referring to FIG. 2B, some FCAW-G processes are characterized by small droplet arc transfer with a smooth, spray arc. Some FCAW-G processes according to embodiments are performed under DC+ polarity. Some FCAW-G systems/processes are more adapted, e.g., compared to FCAW-S processes, for indoor welding, as they have smoother arc characteristics. However, embodiments are not so limited and some FCAW-G processes can be adapted for outdoor welding.

Aluminum-Containing Welding Electrodes

Various embodiments disclosed herein aim to address the increasingly complex and competing characteristics of weld beads resulting from various welding processes described above. The competing characteristics include high toughness, e.g., high toughness at low temperatures, small statistical scatter of toughness, low tendency for hot cracking and low porosity, among other characteristics. Furthermore, these characteristics may be constrained by economic considerations, e.g., the cost of consumable electrodes. To address these and other needs, aluminum-containing electrodes are cored electrodes, according to various embodiments.

As described above, cored electrodes are composite electrodes having a sheath formed of, e.g., a steel composition, with a core of particles having specifically selected iron and other metal powders and alloys. Additives such as stabilizers and arc enhancers can be added easily during manufacturing, providing a wider operating window for the welder.

A cored electrode is a continuously fed tubular metal sheath with a core that can include particles or powders. The core may include fluxing elements, deoxidizing and denitriding agents, and alloying materials, as well as elements that increase toughness and strength, improve corrosion resistance, and stabilize the arc. As described above, a cored electrode can be categorized as one of the following: metal-cored electrodes (GMAW-C), self-shielded flux-cored electrodes (FCAW-S) and gas-shielded flux-cored electrodes (FCAW-G).

Because of the flexibility in manufacturing, when a job calls for special electrodes, cored electrodes can be more economical than solid electrodes. Because the manufacturing process involves blending metal powders instead of creating a special melt of steel, small quantities are easier to produce, and minimum order quantities are much lower. As a result, cored electrodes can be produced with shorter turnaround times and at lower cost than special-ordered solid electrodes. Thus, in the following, various embodiments of electrode wires including an aluminum-containing core surrounded by a sheath are described.

In one aspect of various embodiments disclosed herein, a balance between these competing characteristics can be achieved in part by configuring the welding wire such that the resulting weld bead contains a controlled amount of austenite. As described herein, a weld bead having a controlled-fraction of FCC austenite refers to a weld bead formed from a weld wire to have greater than 20%, 30% or 40%, or to have percentage in a range defined by these percentages, by weight of the weld bead. The inventors have found that, advantageously, having the controlled amount (e.g., >30% by weight) of austenite, when achieved at least in part with a relatively high concentration of aluminum and various other elements in the weld bead as described infra, a balance between the various competing technical needs as well as the cost constraints can be satisfied. Thus, advantageously, embodiments disclosed herein relate to electrodes, e.g., cored electrodes, comprising aluminum (Al) at a concentration between about 4 weight % and about 8 weight % on the basis of the total weight of the welding wire. The weld beads resulting from the aluminum-containing electrodes achieves, among other characteristics, low porosity, high fracture toughness at low temperatures and high resistance to hot cracking. As described herein, high fracture toughness refers to a fracture toughness value greater than about 20, 50, 100, 150 or 200 ft-lbs., as measured using Charpy impact test known in the relevant industry. As described herein, low temperature fracture toughness refers to fracture toughness measured at temperatures below about 0° F., −20° F., or −40° F.

FIGS. 3A-3D schematically illustrate welding electrode wires 30A-30D comprising aluminum-containing cores 38a-38d surrounded by a sheath 34 and configured to serve as an electrode during metal arc welding, according to embodiments. The welding electrode wires 30A-30D includes a sheath 34 having a first base metal composition and cores 38a-38d surrounded by the sheath 34, where the cores 38a-38d comprise a second base metal composition and various other elements described infra, whose combination is adapted for forming a weld bead having controlled amounts of the austenite phase. In particular, the cores 38a-38d include aluminum (Al) at a concentration between about 4 weight % and about 8 weight % on the basis of the total weight of the welding wire, where Al is in an elemental form or is alloyed with a different metal element. In various embodiments, compositions of the first base metal of the sheath 34 and the second base metal of the cores 38a-38d are the same, while in other embodiments, the compositions of first base metal and the second base metal are different.

In various embodiments of the electrode wires 30A-30D, the one or both of the first and second base metal compositions comprise a steel composition. In some embodiments, the base metal composition can be a carbon steel composition. Non-limiting example carbon steel compositions include Fe and one or more of C at a concentration between about 0.01 wt % and about 0.5 wt %, Si at a concentration between about 0.1 wt % and about 1.5 wt %, Mn at a concentration between about 0.5 wt % and about 5 wt %, S at a concentration between about 0.001 wt % and about 0.05 wt %, P at a concentration between about 0.001 wt % and about 0.05 wt %, Ti at a concentration between about 0.01 wt % and about 0.5 wt %, Zr at a concentration between about 0.01 wt % and about 0.5 wt %, Al at a concentration between about 0.01 wt % and about 0.5 wt % and Cu at a concentration between about 0.1 wt % and about 1 wt %.

In some other embodiments, one or both of the first and second base metal compositions can be a low-carbon steel composition. Some non-limiting examples include compositions having C at a concentration less than about 0.10 wt % and Mn at a concentration up to about 0.4 wt %, and compositions having C at a concentration less than about 0.30 wt % and Mn at a concentration up to about 1.5 wt %.

In some other embodiments, one or both of the first and second base metal compositions can be a low-alloy steel composition. To provide some non-limiting example compositions, a low-alloy steel composition includes Fe and one or more of C at a concentration between about 0.01 wt % and about 0.5 wt %, Si at a concentration between about 0.1 wt % and about 1.0 wt %, Mn at a concentration between about 0.5 wt % and about 5 wt %, S at a concentration between about 0.001 wt % and about 0.05 wt %, P at a concentration between about 0.001 wt % and about 0.05 wt %, Ni at a concentration between about 0.01 wt % and about 5 wt %, Cr at a concentration between about 0.1 wt % and about 0.5 wt %, Mo at a concentration between about 0.1 wt % and about 1 wt %, V at a concentration between about 0.001 wt % and about 0.1 wt %, Ti at a concentration between about 0.01 wt % and about 0.5 wt %, Zr at a concentration between about 0.01 wt % and about 0.5 wt %, Al at a concentration between about 0.01 wt % and about 0.5 wt % and Cu at a concentration between about 0.1 wt % and about 1 wt %.

In some other embodiments, one or both of the first and second base metal compositions can be a stainless steel composition. To provide some non-limiting example compositions, a stainless steel composition typically includes Fe and one or more of C at a concentration between about 0.01 wt % and about 1 wt %, Si at a concentration between about 0.1 wt % and about 5.0 wt %, Cr at a concentration between about 10 wt % and about 30 wt %, Ni at a concentration between about 0.1 wt % and about 40 wt %, Mn at a concentration between about 0.1 wt % and about 10 wt %, S at a concentration between about 0.001 wt % and about 0.05 wt % and P at a concentration between about 0.001 wt % and about 0.05 wt %.

Without being bound to any theory, various elements incorporated in the first and/or second above can provide particular advantages in steel welding, as discussed herein to provide few examples. For example, as discussed further below, carbon, manganese, nickel and copper can each serve to stabilize the austenite phase, which in turn can improve fracture toughness in the weldment, which can be an indicator of strength and ductility. Manganese can further serve as a deoxidizer which removes oxygen from the weld and reduces weld metal porosity. Copper can be added intentionally as part of the manufacturing process can be present as a result of coating of the wire electrodes (if copper-coated) for improved conductivity, and therefore, better arc initiation between the welding electrode and the contact tip.

Without being bound to any theory, as discussed further below, aluminum, silicon, chromium and molybdenum can serve as a ferrite-stabilizing element, which can in turn improve hot cracking performance of the weldment. Silicon can also serve as a deoxidizer which removes oxygen from the weldment, and reduce weld metal porosity. In general, the higher the level of silicon in the metal, the more fluid the weld puddle. Additions of silicon can also increase tensile and yield strength. Chromium can also improve corrosion resistance. Molybdenum can also add strength and improve impact properties, even when the weld is subject to stress relieving post-weld heat treatment.

Without being bound to any theory, phosphorus is generally undesirable to the weld deposit, as it can contribute to weld cracking. Sulfur is also generally undesirable for weldability and can contribute to weld cracking. However, in limited amounts, sulfur or phosphorus can improve fluidity and wetting of the weld puddle.

Without being bound to any theory, titanium can serve as a ferrite-stabilizing element and as a deoxidizer and/or a denitridizer. Zirconium can serve as a deoxidizer.

To achieve various advantageous characteristics of the weld process and/or the weld bead describe herein, welding wires 30A-30D include the cores 38a-38d having relatively high amounts of aluminum (Al) and manganese (Mn), according to embodiments. In various embodiments, the cores 38a-38d comprise Al at a concentration between about 1 weight % and about 20 weight %, between about 2 weight % and about 15 weight %, between about 3 weight % and about 10 weight %, between about 4 weight % and about 8 weight %, or a concentration within a range defined by any of these values, for instance about 5 weight %, on the basis of the total weight of the welding wire, according to embodiments. The core 38 additionally comprises manganese (Mn) at a concentration between about 1 weight % and about 60 weight %, between about 5 weight % and about 40 weight %, between about 10 weight % and about 30 weight %, or a concentration within a range defined by any of these values, for instance about 18 weight %, on the basis of the total weight of the welding wire. In some embodiments, welding wires 30A-30D include the cores 38a-38d having a combination of concentrations where Al concentration is between about 3 weight % and 20% and Mn concentration is between about 10% and 60%, Al concentration is between about 8 weight % and 20% and Mn concentration is between about 30% and 60%, where Al concentration is between about 9 weight % and 20% and Mn concentration is between about 35% and 60%, or where Al concentration is between about 10 weight % and about 20% and Mn concentration is between 40% and about 60%.

In various embodiments, each of Al and Mn is in an elemental form or is alloyed form with a different metal element. For example, when in an alloyed form, Al and/or Mn may be present as part of a metallic alloy compound, e.g., MMg, MSi MZr, MFe, where M is Al or Mn, such as AlMg, AlSi, AlZr, FeMn, FeMnSi, or MnSi, among other metallic alloy compounds. Without being bound to any theory, the presence of Al in the core 38a in amounts disclosed herein, alone or in combination with other elements, can provide various advantages in the resulting weld bead. For example, similar to Cr, when present within the disclosed range, Al can advantageously provide superior oxidation resistance of the resulting weldment.

In addition, Al in particular amounts described herein, alone in combination with other elements, can advantageously provide relatively low porosity in the resulting weldment, thereby providing wider process windows, e.g., providing a wider range of deposition rate.

In addition, Al in particular amounts described herein, alone or in combination with other elements, can serve as deoxidizing and/or denitridizing agents such that the resulting weld bead has nitrogen (N) or oxygen (O) at a concentration greater than zero weight % and less than about 1 weight %, greater than zero weight % and less than about 0.5 weight %, or greater than zero weight % and less than about 0.1 weight %, for instance about 0.2 weight %, on the basis of the total weight of the weld bead, according to embodiments.

As described herein, austenite refers to a face center cubic (FCC) phase of iron atomic structure which can contain up to about 2% carbon in solution. As described herein, ferrite refers to a body center cubic (BCC) phase of iron which can hold very little carbon; typically 0.0001% at room temperature. It can exist as either an alpha or delta ferrite. The inventors have recognized that the advantages of having controlled and balanced amounts of the FCC phase and the BCC phase, which may be associated with the various desirable bead characteristics described herein, can be realized by having relatively high amounts of Al alone or in combination with various other elements as describe herein. Having controlled amounts of the FCC and BCC phases in the weld beads can be desirable because, e.g., without being bound to any theory, relatively high ferrite content can be associated with relatively poor low temperature fracture toughness, while being associated with relatively superior hot or solidification cracking performance. In contrast, relatively low ferrite content can be associated with relatively superior low temperature fracture toughness while being associated with relatively poor hot or solidification cracking performance. As described herein, standardized expression known as the ferrite number (FN), whose values range from 1 to 125, adopted by the Welding Research Council (WRC), the American Welding Society (AWS), and other agencies, is used to describe the relative amount of ferrite in the weldment.

The inventors have recognized that Al, when present in relatively high concentrations, can be a stabilizer for the BCC phase of iron, or ferrite. That is, the concentration of Al can be proportional to the stability or the amount of the BCC phase of iron. Thus, in various embodiments disclosed herein, the BCC-stabilizing effect of Al can be at least partially offset using one of more FCC phase or austenite stabilizing elements in iron, e.g., Ni, Mn, Cu, Co, C and/or N, as described below.

In particular, without being bound to any theory, Mn in particular amounts described herein, alone or in combination with other elements including Al having the amounts described above, can balance the amounts of FCC and BCC phases to produce a weld bead having a relatively high fracture toughness, e.g., greater than about 20, 50, 100, 150 or 200 ft-lbs., as measured using Charpy impact test, when measured at temperatures below about 0° F., −20° F. or −40° F., at least in part due to the presence of relatively high amounts of austenite. In addition, Mn in particular amounts described herein can produce a weld bead with relatively low scatter in measured fracture toughness values. For example, under some circumstances, the measured fracture toughness values display a bimodal distribution having a high toughness distribution and a low toughness distribution. According to embodiments, greater than 80% or 90% of the measured data points are included in the high toughness distribution, while the remaining data points are included in the low toughness distribution.

Under some circumstances, the inventors have found that it can be critical to have a concentration of Al that does not exceed about 20 weight %, about 15 weight %, or about 10 weight %, on the basis of the total weight of the welding wire. In addition, it can be critical that the concentration of Mn exceed about 1 weight %, about 5 weight % or about 10 weight %, on the basis of the total weight of the welding wire. In addition, under some circumstances, the inventors have found that it can be critical to have a concentration of Al that exceeds about 1 weight %, about 2 weight %, or about 3 weight %, on the basis of the total weight of the welding wire. In addition, it can be critical that the concentration of Mn does not exceed about 30 weight %, about 40 weight % or about 50 weight %, on the basis of the total weight of the welding wire. When the combination of concentrations of Al and Mn are controlled as described, a combination of desirable characteristics including high fracture toughness, low porosity and resistance to hot cracking can be achieved.

In addition, in some embodiments, the cores 38a-38d of the cored wires 30A-30D further comprise nickel (Ni) at a concentration greater than zero weight % and less than about 50 weight %, greater than zero weight % and less than about 20 weight %, greater than zero weight % and less than about 10 weight %, or greater than zero weight % and less than about 10 weight %, for instance about 2 weight %, on the basis of the total weight of the welding wire. In some embodiments, the core 38a-38d of the cored wires 30A-30D further comprises one or more of copper (Cu) and cobalt (Co) at a concentration greater than zero weight % and less than about 10 weight %, greater than zero weight % and less than about 5 weight %, or greater than zero weight % and less than about 2 weight, for instance about 5 weight %, on the basis of the total weight of the welding wire.

In some embodiments, the cores 38a-38d of the cored wires 30A-30D further comprise carbon (C) at a concentration greater than zero weight % and less than about 5 weight %, greater than zero weight % and less than about 2.5 weight %, or greater than zero weight % and less than about 1 weight %, for instance about 0.2%, on the basis of the total weight of the welding wire. In some embodiments, the core 38 of the cored wire 30A further comprises nitrogen (N) at a concentration greater than zero weight % and less than about 4 weight %, greater than zero weight % and less than about 2 weight %, or greater than zero weight % and less than about 1 weight %, for instance about 0.2 weight %, on the basis of the total weight of the welding wire.

In some embodiments, the cores 38a-38d having particular combinations of the various elements give rise to the various desirable attributes described above. In particular, the inventors have found that the cores 38a-38d of the welding wires 30A-30D comprise a combination of Mn, Ni, C, Ni, Cu and Co, which can collectively serve to stabilize the FCC phase in the weldment, among other effects. In particular, the inventors have found that a measure of the amount of FCC-stabilizing elements can be expressed by an equivalent nickel concentration, $Ni_{eq}$, described by the following formula:

$$Ni_{eq}=2[Mn]+[Ni]+30[C]+20[N]+0.3[Cu]+0.3[Co] \quad [1]$$

In various embodiments, the $Ni_{eq}$ is between about 10 weight % and about 80 weight %, between about 20 weight % and about 70 weight % or between about 30 weight % and about 60 weight %, where [Mn], [Ni], [C], [N], [Cu] and [Co] represent weight % of respective elements. In Eq. [1], ratios of the elements can vary within +/−20%, 10% or 5%, according to embodiments. For example, the ratio of manganese to nickel can be 2.0+/−0.4, 2.0+/−0.2 or 2.0+/−0.1.

As described above, various austenite-stabilizing elements including Mn, Ni, C, N, Cu and Co can be included in the core to control the relative fraction of austenite in the resulting weld bead, among other characteristics. In some embodiments, the cores 38a-38d of the electrode wires 30A-30D, respectively, may further include, without being bound to any theory, elements that may be active in stabilizing the ferrite phase. Accordingly, in some embodiments, the cores 38a-38d of the electrode wires 30A-30D additionally includes one or more of ferrite-stabilizing elements selected from the group consisting of chromium (Cr), molybdenum (Mo), silicon (Si), titanium (Ti), niobium (Nb), vanadium (V) and tungsten (W) such that the weld bead has a total concentration of the ferrite-stabilizing elements that is greater than 0 weight % and less than about 20 weight %, greater than 0 weight % and less than about 10 weight %, or greater than 0 weight % and less than about 5 weight % according to embodiments.

Thus, in various embodiments of core-electrode wires 30A-30D described herein, the cores 30a-30d includes aluminum. In addition, the cores 30a-30d may include one or more austenite-stabilizing elements selected from the group consisting of Mn, Ni, C, N, Cu and Co and/or one or more ferrite-stabilizing elements selected from the group consisting of Cr, Mo, Si, Ti, Nb, V and W.

According to embodiments, the above-described concentrations on the basis of the total weight of the welding wire can be achieved at least in part by configuring the metal-cored electrodes 30a/30b to have an outer diameter (OD) between 0.045" (1.1 mm) and 0.068" (1.7 mm), between 0.045" (1.1 mm) and 3/32" (2.4 mm) or between 0.052" (1.4 mm) and 0.068" (1.7 mm).

According to embodiments, the above-described concentrations can be achieved at least in part by configuring the contents of the core 38a/38b/38c/38d and the sheath 34, such that the contents of the core constitute, on the basis of the total weight of the metal cored electrode wires 30A/30B/30C/30D, between about 1 wt % and about 80 wt %, between about 10 wt % and about 50 wt %, or between about 15 wt % and about 30 wt %.

According to embodiments, various embodiments disclosed herein can be optimized for any one of metal-cored (GMAW-C) electrodes, self-shielded flux-cored (FCAW-S) electrodes and gas-shielded flux-cored (FCAW-G) electrodes.

In the above, embodiments of the cored electrodes 30A-30D have been described without particular reference to the structure of the cores 38a-38d. The cored electrode 30A can, e.g., have the core 38a configured as a solid or as a volume filled with powder. In the following, in reference to FIGS. 3B-3D, embodiments of welding electrode wires 30B, 30C, 30D having respective cores 38b, 38c, 38d arranged to include differently arranged powders are described. In particular, each of the cores 38b, 38c, 38d is at least partially filled with particles comprising various elements described above and a second base metal composition as described above, whose combination is adapted for forming a weld bead having a controlled fraction of the austenite phase. The particles in cored electrodes that include Al and austenite-stabilizing elements and/or ferrite-stabilizing elements generally include metal and alloy particles, rather than compound particles other than metal and alloy particles, such as oxides or fluoride particles, and are configured to produce relatively small islands of slag on the face of the resulting weld beads. However, embodiments are not so limited, and Al and austenite-stabilizing element and/or ferrite-stabilizing elements can be in the form of compounds such as oxides, nitrides and fluorides.

Figure 3A:
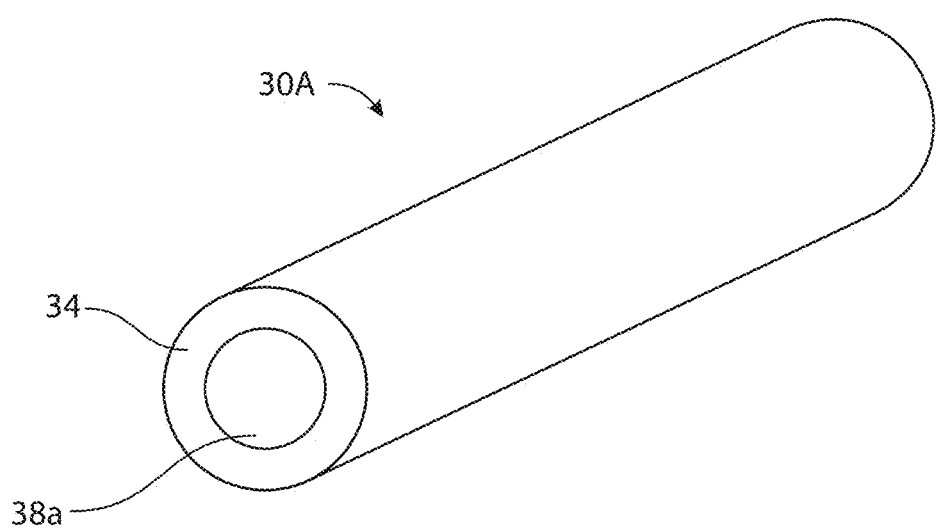
FIG. 3A is a schematic illustration of a flux-cored electrode wire comprising aluminum in the core, according to embodiments.
Figure 3B:
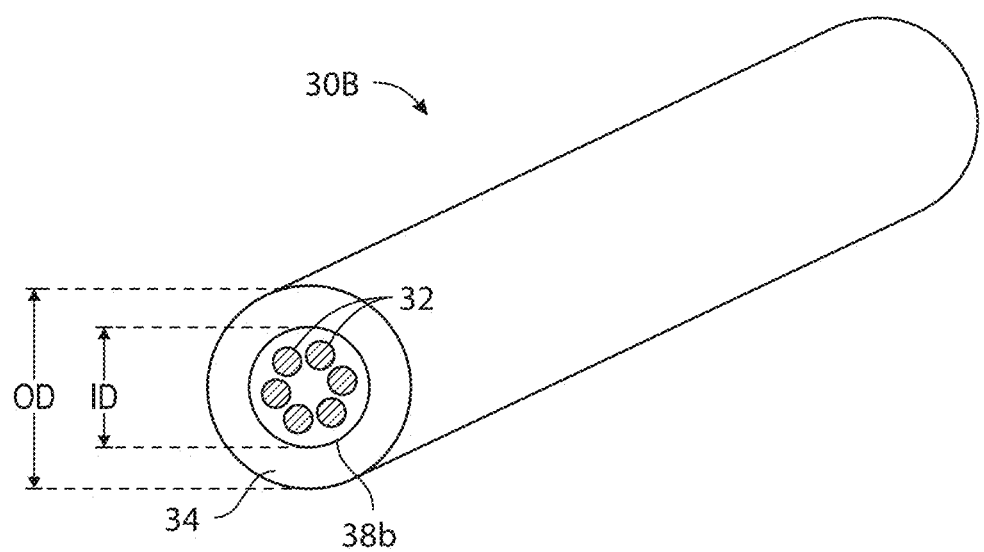
FIG. 3B is a schematic illustration of a flux-cored electrode wire comprising aluminum in the core, according to embodiments.

In the illustrated embodiment of FIG. 3B, particles 32 are substantially uniform in composition. That is, each of the particles 32 contains the second base metal including any one of the steel compositions described above, and aluminum. Each of the particles can also include one or more austenite-stabilizing elements and/or one or more ferrite-stabilizing elements, as described above. The illustrated configuration may result, e.g., when the particles 32 are produced from the same alloy ingot.

Still referring to FIG. 3B, particles 32 are formed of an alloy of the second base metal composition and aluminum. When included, the particles 32 are formed of an alloy of the second base metal composition and one or more austenite-stabilizing elements and/or one or more ferrite-stabilizing elements. For example, atoms of Al and one or more of austenite-stabilizing elements (Mn, Ni, C, N, Cu and Co), and/or one or more of ferrite-stabilizing elements (Cr, Mo, Si, Ti, Nb, V and W) can be dissolved, or directly incorporated, in the lattice (e.g., a body-centered cubic lattice or a face-centered cubic lattice of the steel composition) of the second base metal composition, e.g., substitutionally and/or interstitially. The atoms of Al and one or more of austenite-stabilizing element can also be clustered, e.g., form precipitates, within a matrix of the second base metal composition. However, embodiments are not so limited, and alternative embodiments are possible, where atoms of Al and one or more of austenite-stabilizing elements and/or ferrite-stabilizing elements are incorporated in the second base metal composition in the form of a compound, e.g., an inorganic compound other than an alloy, e.g., silicates, titanates, carbonates, halides, phosphates, sulfides, hydroxides, fluorides and oxides.

Figure 3C:
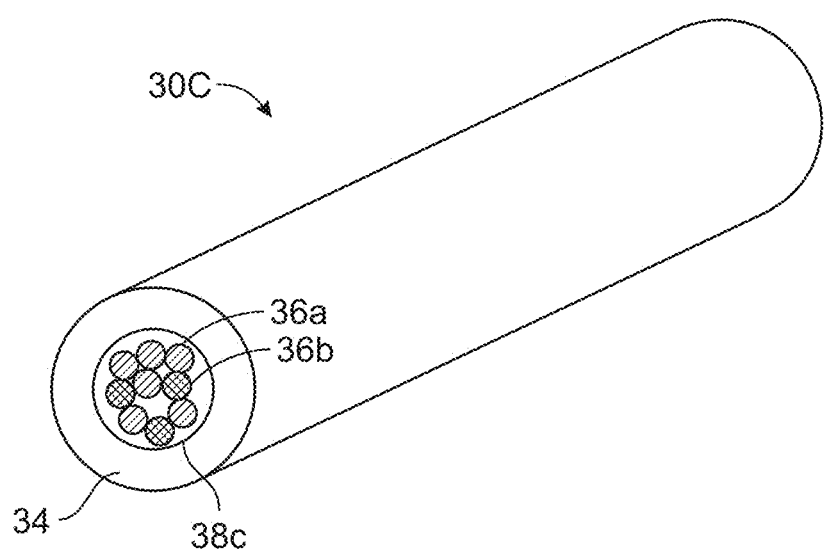
FIG. 3C is a schematic illustration of a flux-cored electrode wire comprising aluminum in the core, according to embodiments.

Referring now to the welding wire electrode 30C of FIG. 3C, particles 36a, 36b in the core 38c have different compositions. In some embodiments, particles 36a, 36b contain different elements. In some other embodiments, particles 36a, 36b contain the same elements at different concentrations of one or more of the constituent impurities. In the following, while two particles 36a, 36b having different compositions are illustrated, one or more additional particles can be included, where each particle has a different composition.

In the welding wire electrode 30C, the particles 36a, 36b, Al and the one or more of austenite-stabilizing elements and/or ferrite-stabilizing elements can be present in different atomically bonded forms. In some embodiments, Al and one or more of non-volatile austenite-stabilizing elements (Mn, Ni, C, Cu and Co), and/or one or more of ferrite-stabilizing elements (Cr, Mo, Si, Ti, Nb, V and W), can be present in particles 36a, 36b in pure elemental form. In these embodiments, Al and the one or more of austenite-stabilizing elements and/or ferrite-stabilizing elements can be present in a mechanical mixture with the base metal composition. In some other embodiments, atoms of the Al and the one or more of austenite-stabilizing elements and/or ferrite-stabilizing elements are alloyed with atoms of the base metal composition in the particles 36a, 36b. In some other embodiments, Al and the one or more of austenite-stabilizing elements and/or ferrite-stabilizing elements are clustered in the particles 36a, 36b, e.g., in the form of precipitates, within a matrix of the base metal composition. In these embodiments, the cores of the precipitates comprise pure elements, while the outer surfaces of the precipitates are bonded with the atoms of the matrix. Yet other embodiments are possible, where Al and the one or more of austenite-stabilizing elements and/or ferrite-stabilizing elements form nonmetallic compounds, e.g., silicates, titanates, carbonates, halides, phosphates, sulfides, hydroxides, fluorides and oxides that form a mixture, e.g., a mechanical mixture, with the base metal composition.

Still referring to FIG. 3C, different particles 36a, 36b can have different compositional arrangements. In some embodiments, all particles 36a, 36b include a second base metal composition (e.g., any of the steel compositions described supra) and Al and one or more of austenite-stabilizing elements (Mn, Ni, C, N, Cu and Co) and/or one or more of ferrite-stabilizing elements (Cr, Mo, Si, Ti, Nb, V and W), but at different concentrations. In some other embodiments, some particles, e.g., particles 36a include a second base metal composition while not including one or both of austenite-stabilizing elements and ferrite-stabilizing elements, while other particles, e.g., particles 36b include one or both of austenite-stabilizing elements and ferrite-stabilizing elements. In some other embodiments, some particles, e.g., 36a do not include a second base metal composition while including one or both of austenite-stabilizing elements and ferrite-stabilizing elements, while other particles 36b include both a second base metal composition and one or both of austenite-stabilizing elements and ferrite-stabilizing elements. In some other embodiments, some particles 36a include a second base metal composition and include one or both of austenite-stabilizing elements and ferrite-stabilizing elements, while other particles 36b do not include a second base metal composition while including one or both of austenite-stabilizing elements and ferrite-stabilizing elements. In some other embodiments, some particles 36a do not include a second base metal composition while including one or both of austenite-stabilizing elements and ferrite-stabilizing elements, while other particles 36b include a second base metal composition while not including one or both of austenite-stabilizing elements and ferrite-stabilizing elements. In some other implementations, no particles include a second base metal composition while all particles 36a, 36b include one or both of austenite-stabilizing elements and ferrite-stabilizing elements at different concentrations.

In the above with respect to FIGS. 3A-3C, the welding wire electrodes 30A-30C have been described without a particular reference to a particular suitability for different welding processes among, e.g., GMAW-C or FCAW. As described above, unlike metal-cored electrodes (GMAW-C), cored electrodes used in flux-cored arc welding (FCAW) additionally includes fluxing agents designed to provide protection for the weld pool and the weld bead against atmospheric contamination during welding, at least partially in lieu of a shielding gas. The fluxing agent forms a slag for flux-cored arc welding (FCAW). In FCAW, the material of the flux is not intended to be incorporated into the final weld bead. Instead, the flux forms a slag, which is removed after completion of welding. Thus, while metal-cored electrodes may not include fluxing agents, welding wires configured for FCAW includes fluxing agents.

It will be appreciated that metal-cored electrodes and flux-cored electrodes are further distinguishable based on the resulting bead characteristics. According to various embodiments, metal-cored electrodes descried herein produce slag islands on the face of the resulting weld bead. In contrast, flux-cored electrodes produce extensive slag coverage of the face of the resulting weld bead. For example, slag islands produced by metal-cored electrodes may cover less than 50%, 30% or 10% of the surface area of the weld bead. In contrast, slags produced by flux-cored electrodes may cover more than 50%, 70% or 90% of the surface area of the weld bead. In the following, embodiments in which the amount and the arrangement of Al and the one or more of austenite-stabilizing elements and/or ferrite-stabilizing elements may be more advantageous when present in the cores of flux-cored electrodes, including FCAW-S and FCAW-G.

Figure 3D:
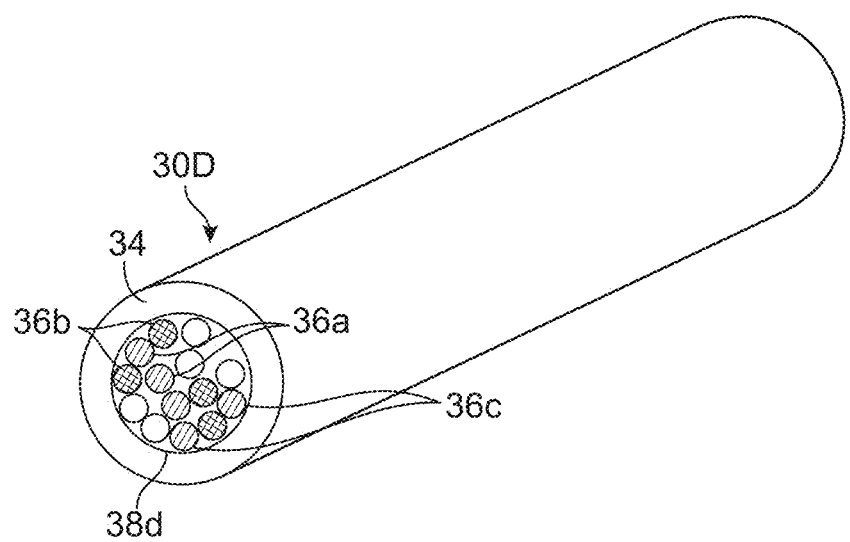
FIG. 3D is a schematic illustration of a flux-cored electrode wire comprising aluminum in the core, according to embodiments.

FIG. 3D is a schematic illustration of a welding wire electrode wire 30D configured to serve as an electrode during FCAW. Similar to the welding wire electrode 30C described above with respect to FIG. 3C, the welding wire electrode 30D includes a sheath 34 formed of a first base metal that can include any one of the steel compositions described above. The welding wire electrode 30D additionally includes a core 38d having one or more different particles 36a or 36b, according to any one or combination of configurations described above with respect to the particles 32 in FIG. 3B or the particles 36a, 36b in FIG. 3C. In addition, in the illustrated embodiment of FIG. 3D, the core 38d of the welding wire electrode 30D additionally includes one or more non-metallic particles 36c which include fluxing or slag-forming agents, according to embodiments.

Without being bound to any theory, the one or more non-metallic particles 36c, which can include fluorine-containing compounds and/or oxygen-containing compounds, can modify the properties of the slag to improve the shape of the bead, e.g., to reduce the tendency of gas tracking on the formed weld bead. For example, gas tracking, which is a phenomenon observed wherein craters resembling worms are observed on the surface of the weld bead, may be reduced when fluxing agents are present. Without being bound to any theory, gas tracking can be observed, e.g., in fast freezing slag systems (rutile based) where the slag solidifies much faster than the weld pool. Due to the rapid solidification of the slag, the gas evolving from the molten weld is partially trapped and thus forms craters on the weld bead surface.

Without being bound to any theory, some fluxing agents including fluorine-containing compounds and/or oxygen-containing compounds can also reduce the melting point of slag. The lower melting point of the slag allows the slag to remain molten for a longer time thereby allowing more time for gases to evolve from the molten weld and to dissolve in the slag. The inclusion of fluorine in the slag can also promote the formation of HF, thereby reducing hydrogen from the weld, which decreases the partial pressure of hydrogen in the weld system to reducing the incidence of gas tracking.

In particular embodiments in which the welding wires are particularly adapted for a FCAW-S processes, a slag system based on an aluminum deoxidizing and denitridizing agents can be particularly beneficial. In these embodiments, aluminum enters the weld pool and forms a fluxing agent which includes aluminum oxide, which has a relatively high melting temperature. The high melting-temperature aluminum oxide can be combined with low-melting-temperature elements in the flux, to form an effective slag system. The slag elements including aluminum oxide can melt during welding and float to the top of the molten weld pool, protecting the process from atmospheric contamination.

FCAW-S has a relatively high tolerance for nitrogen, and the slag systems make this possible. The aluminum molecules attract oxygen and nitrogen atoms, which connect to form aluminum oxides and nitrides. Thus formed aluminum oxide-based slag system having a high-melting-point (that is, fast-freezing) and lightweight float to the weld surface quickly. In effect, the slag system transforms oxygen and nitrogen-potential contaminants-into chemical compounds that protect the weld.

Many FCAW-S wires can employ a basic system or an acidic system. In basic systems, fluorine-containing compounds work together with the aluminum compounds. In acidic systems, on the other hand, iron oxide can be employed. The basic systems do a better job of cleaning the weld metal and tend to be suited for structural-critical work, meeting low-temperature toughness and other stringent mechanical-property requirements. Acidic systems promote smooth, fast welding. This is because, without being bound to any theory, during welding, molecules are ionized, and specific slag systems are associated with different levels of heat to accomplish the ionization. In fluoride systems, a relatively large amount of heat goes into breaking up the molecules to form fluoride bonds. On the other hand, a relatively lower amount of heat is used to break up the acidic, oxide-based molecules. The quick reaction leads to fast slag-freezing and, ultimately, high deposition rates.

In some embodiments, the non-metallic particles 36c include inorganic compounds that include a metal oxide or a metal fluoride of a metal other than Al or Mn.

In some embodiments disclosed herein, when included as part of non-metallic particles 36c, the concentration of fluorine (F) in the electrode wire can be greater than zero but less than about 5 wt. %, greater than zero but less than about 1.5 wt. %, or greater than zero but less than about 1.0 wt. %, on the basis of the total weight of the electrode wire, for instance about 0.1 wt. %.

Other embodiments are possible, where, when included as part of non-metallic particles 36c, the fluorine-containing particles include non-polymeric or inorganic fluorine-containing compounds, such as aluminum fluoride, barium fluoride, bismuth fluoride, calcium fluoride, manganese fluoride, potassium fluoride, sodium fluoride, strontium fluoride, polytetrafluoroethylene (such as Teflon®), $Na_2SiF_6$, $K_2SiF_6$, $Na_3AlF_6$ and/or $K_3AlF_6$; however, it will be appreciated that other or additional fluorine containing compounds can be used.

Examples of non fluorine-containing non-metallic particles 36c include transition metal oxide, e.g., titanium oxide (e.g., rutile, etc.) and/or a transition metal containing compound (e.g., potassium silico-titanate, sodium silico-titanate, etc.), according to embodiments. Generally, when both are included, the weight percent of the non fluorine-containing particles is greater than the weight percent of the fluorine containing compound, at a ratio between about 0.5-10:1, typically about 0.5-5:1, and more typically about 0.7-4:1, for example.

Example Weldments Formed Using Aluminum-Containing Welding Electrodes

Using various welding wires described above, a weld beads having particular compositions can be formed, which can be substantially the same or substantially different compared to the composition of the welding wire. In various embodiments, a weld bead (e.g., weld bead 24 in FIGS. 2A, 2B) formed using the welding wire (e.g., welding sires 30A-30D in FIGS. 3A-3D) has iron (Fe) at concentration between about 50 weight % and about 85 weight %. and aluminum (Al) at a concentration between about 4 weight % and about 8 weight %, or any concentrations of Fe and/or Al of the welding wire described above. In addition, the weld bead includes Al and one or more of austenite-stabilizing elements (Mn, Ni, C, N, Cu and Co) and/or one or more of ferrite-stabilizing elements (Cr, Mo, Si, Ti, Nb, V and W) in concentrations that are substantially the same as the corresponding concentration(s) of the welding wire as described above with respect to FIGS. 3A-3D. The weldment formed using welding wires and welding methods disclosed herein according various embodiments have a ferrite number that is between 1 and 125, between 2 and 20, between 20 and 40, between 40 and 60, between 60 and 80, between 80 and 100, between 100 and 120, between 120 and 140 or a value within a range defined ay any of these values, according to various embodiments.

Figure 4A:
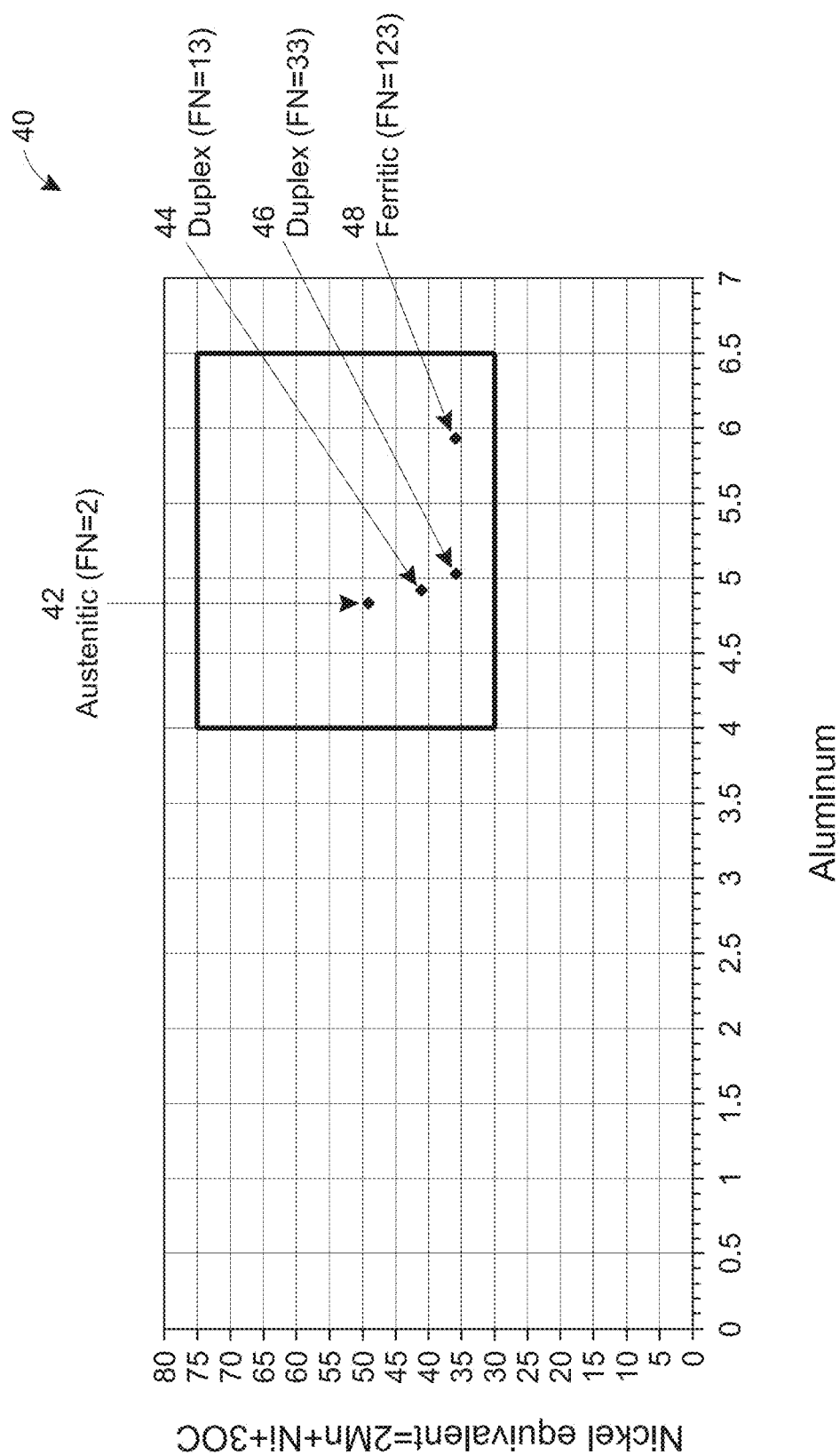
FIG. 4A is a nickel equivalent versus aluminum content for weldments having various ferrite numbers produced from flux-cored electrode wires, according to embodiments.
Figure 4B:
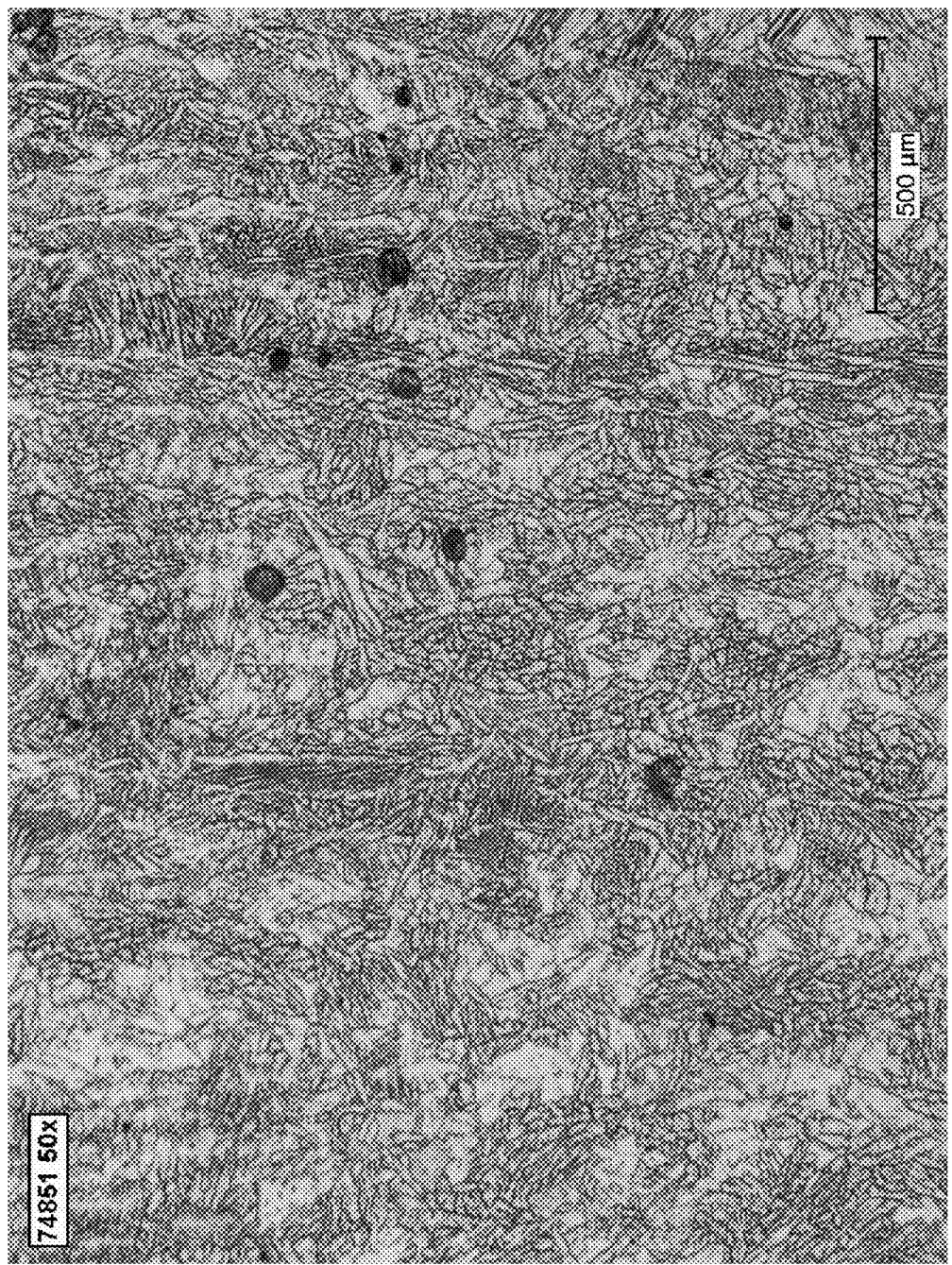
FIG. 4B is a scanning electron micrograph of a weldment having ferrite number 2 in FIG. 4A, according to embodiments.
Figure 4C:
FIG. 4C is a scanning electron micrograph of a weldment having ferrite number 13 in FIG. 4A, according to embodiments.
Figure 4D:
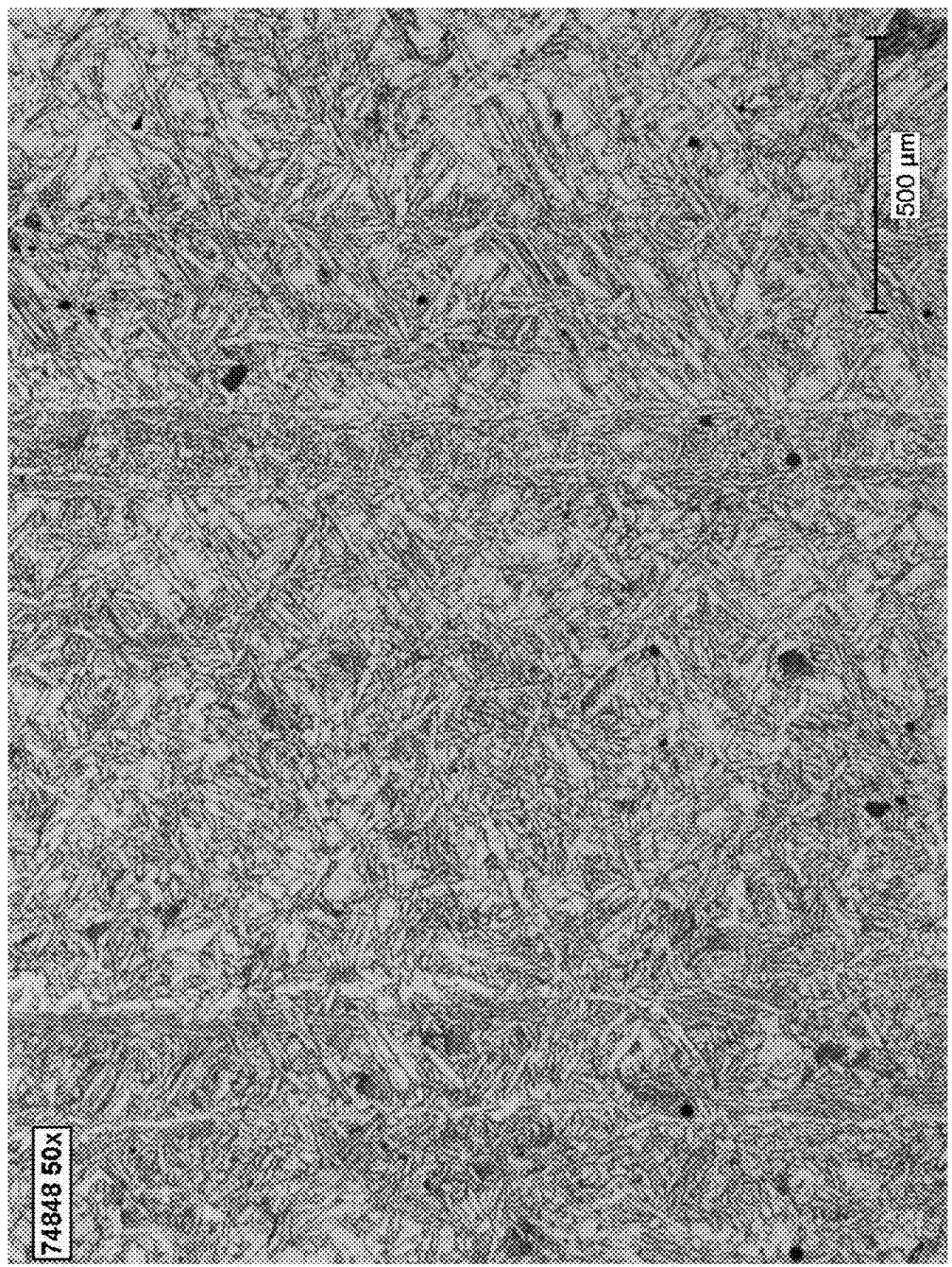
FIG. 4D is a scanning electron micrograph of a weldment having ferrite number 33 in FIG. 4A, according to embodiments.
Figure 4E:
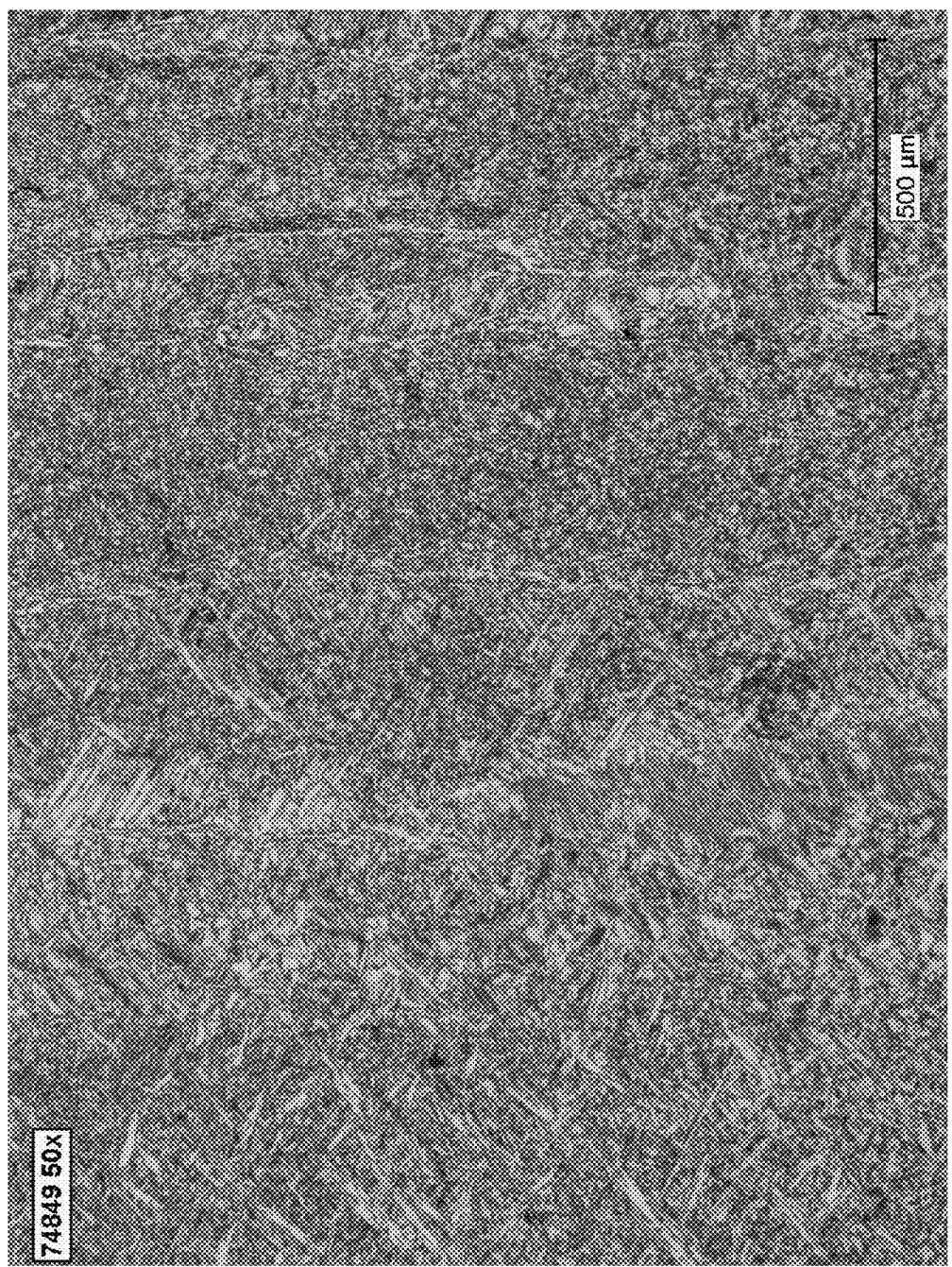
FIG. 4E is a scanning electron micrograph of a weldment having ferrite number 123 in FIG. 4A, according to embodiments.

FIG. 4A is graph 40 illustrating a nickel equivalent versus aluminum content for experimentally produced weldments having various ferrite numbers produced from flux-cored electrode wires, according to embodiments. The experimentally produced weldments include first-fourth compositions 42, 44, 46 and 48 having aluminum contents of 4.8 wt. %, 4.9 wt. %, 5.0 wt. % and 5.9 wt. %, respectively, and corresponding $Ni_{eq}$ according to Eq. [1] above of 49 wt. %, 41 wt. %, 36 wt. % and 35 wt. %, respectively.

FIGS. 4B, 4C, 4D and 4E illustrate SEM micrographs 42a, 44a, 46a and 48a corresponding to the first, second, third and fourth compositions 42, 44, 46 and 48, respectively.

Welding Systems Configured for Using Aluminum-Containing Welding Electrodes

Figure 5:
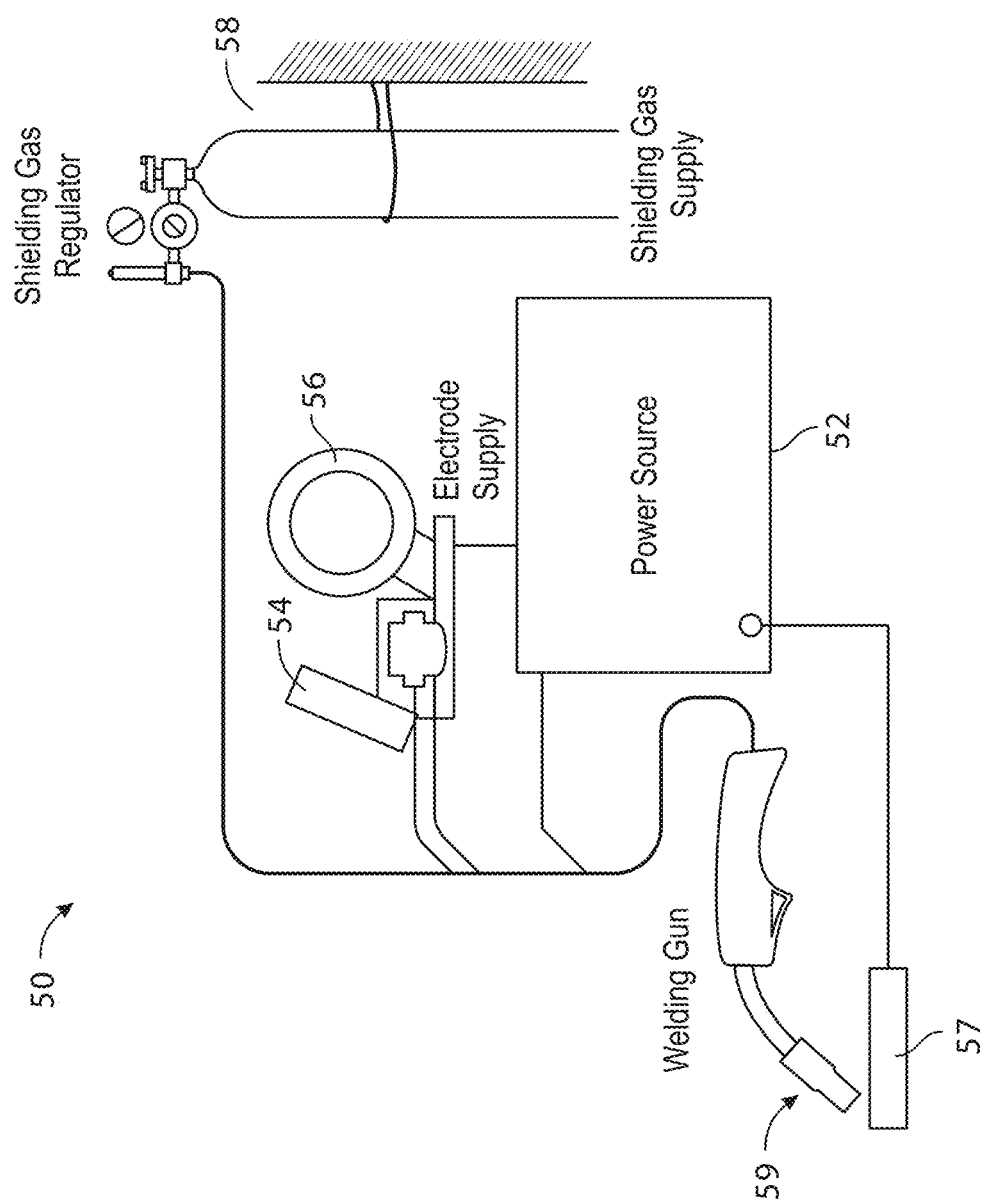
FIG. 5 is a schematic illustration of a metal arc welding system configured for flux-core arc welding using a flux-cored electrode wire comprising aluminum in the core, according to embodiments.

FIG. 5 illustrates an arc welding system 50 configured for use with welding electrodes discussed supra to deposit weld metal at rates of ~30 lbs./hr. or higher for open-arc welding, according to embodiments. In particular, the arc welding system 50 is configured for GMAW, FCAW, FCAW-G, GTAW, SAW, SMAW, or similar arc welding processes that can use a welding electrode comprising an aluminum-containing core, according to embodiments. The arc welding system 50 comprises a welding power source 52, a welding wire drive 54, a shielding gas supply 58, and a welding gun 59. The welding power source 52 is configured to supply power to the welding system 50 and is electrically coupled to the welding wire drive 54 such that the weld electrode wire serves as a first electrode, and is further electrically coupled to a workpiece 57 which serves as a second electrode, as depicted in detail FIG. 1. The welding wire drive is coupled to the welding gun 59 and is configured to supply welding electrode wire from the electrode supply 56 to the welding gun 59 during operation of the welding system 50. In some implementations, the welding power source 52 may also couple and directly supply power to the welding gun 59.

It will be appreciated that, for illustrative purposes, FIG. 5 shows a semi-automatic welding configuration in which an operator operates the welding torch. However, the metal-cored electrodes described herein can be advantageously used in a robotic welding cell, in which a robotic machine operates the welding torch.

The welding power source 52 includes power conversion circuitry that receives input power from an alternating current power source (e.g., an AC power grid, an engine/generator set, or a combination thereof), conditions the input power, and provides DC or AC output power to the welding system 50. The welding power source 52 may power the welding wire drive 54 that, in turn, powers the welding gun 59. The welding power source 52 may include circuit elements (e.g., transformers, rectifiers, switches, and so forth) configured to convert the AC input power to a DC positive or a DC negative output, DC variable polarity, pulsed DC, or a variable balance (e.g., balanced or unbalanced) AC output. It will be appreciated that the welding power source 52 is configured to provide output current between about 100 amps and about 1000 amps, or between about 400 amps and about 800 amps, such that weld metal deposition at rates exceeding about 30 lbs./hr. can be achieved.

The shielding gas supply 58 is configured to supply a shielding gas or shielding gas mixtures from one or more shielding gas sources to the welding gun 59, according to embodiments. A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, etc.). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow may include Ar, $Ar/CO_2$ mixtures, $Ar/CO_2/O_2$ mixtures, Ar/He mixtures, to name a few.

The wire drive 54 may include a permanent magnet motor for providing good control over starting, stopping and speed of wire feed. To enable high weld metal deposition rates exceeding about 30 lbs./hr., the wire drive 54 is configured to provide a wire feed speed between about 50 inches per minute (ipm) and about 2000 ipm, between about 400 ipm and about 1200 ipm, or between about 600 ipm and about 1200 ipm.

In operation, the welding gun 59 receives the welding electrode from the wire drive 54, power from the welding wire drive 54, and a shielding gas flow from the shielding gas supply 58 to perform arc welding on a workpiece 57. The welding gun 59 is be brought sufficiently close to the workpiece 57 such that an arc is be formed between the consumable welding electrode and the workpiece 57, as described supra with respect to FIG. 1. As discussed supra, by controlling the composition of the welding electrode, the chemistry of the arc and/or the resulting weld (e.g., composition and physical characteristics) may be varied.

Welding Method Using Aluminum-Containing Welding Electrodes

Figure 6:
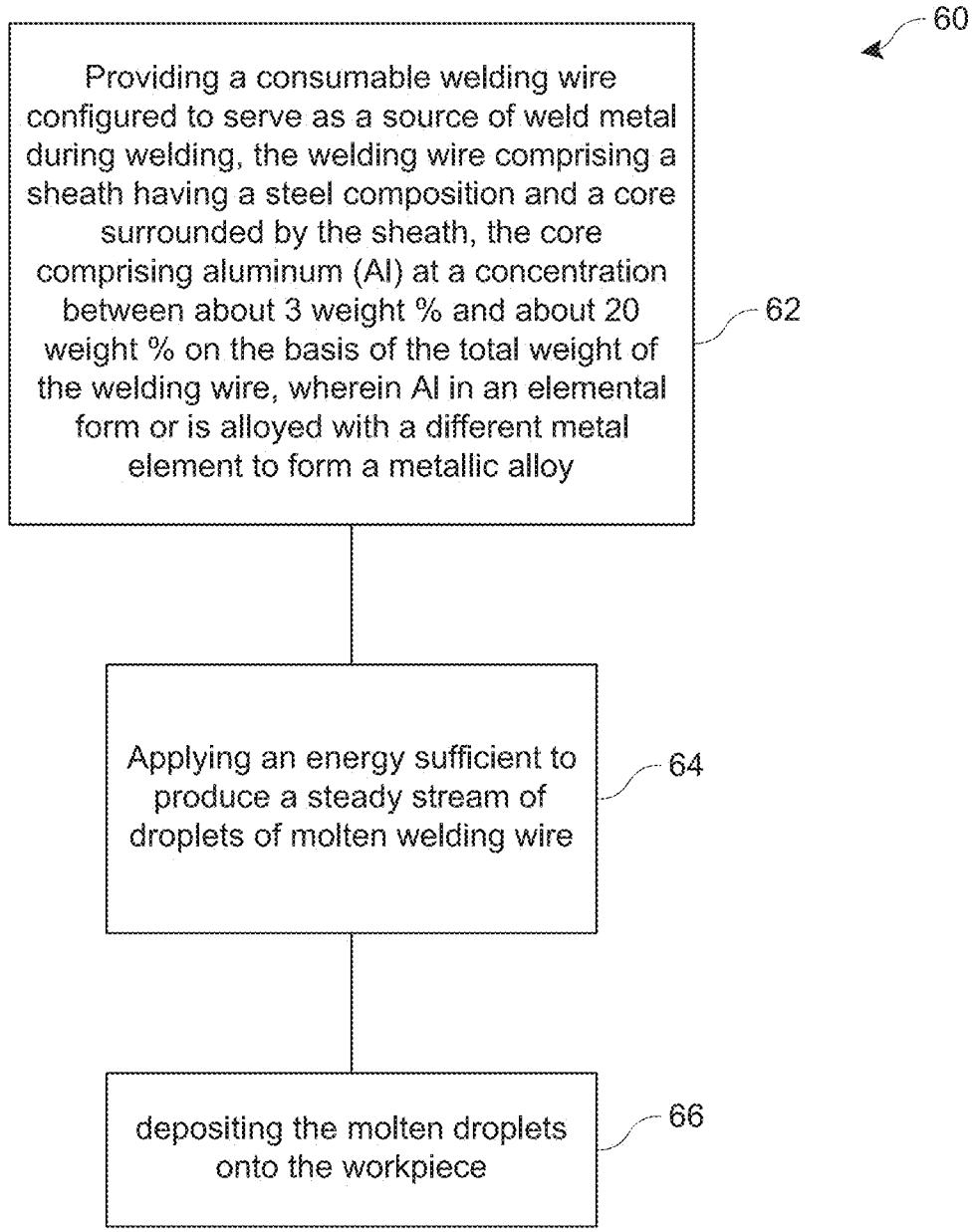
FIG. 6 is a flow chart of a method of flux-core arc welding using a flux-cored electrode wire comprising aluminum in the core, according to embodiments.

Referring to FIG. 6, a method of metal arc welding 60 is described. The method 60 includes providing 62 a welding wire configured to serve as a source of weld metal during welding. The welding wire comprises a sheath having a steel composition and a core surrounded by the sheath. The core comprises aluminum (Al) at a concentration between about 4 weight % and about 8 weight % on the basis of the total weight of the welding wire, wherein Al in an elemental form or is alloyed with a different metal element. The method 60 additionally includes applying 64 a sufficient energy to produce a steady stream of droplets of molten welding wire. The method 60 further includes depositing 66 the molten droplets onto a workpiece at a deposition rate exceeding 25 pounds per hour. In a particular embodiment, depositing 66 comprises depositing under a self-shielded flux-cored arc-welding (FCAW-S) process without a shielding gas as described above, e.g., with respect to FIGS. 2A, 2B.

In the method 60, providing 62 the consumable welding wire comprises providing any welding wire described above, e.g., with respect to FIGS. 3A-3D.

In the method 60, applying the current 64 includes applying an average current between about 300 amps and about 600 amps, between about 400 amps and about 700 amps, or between about 500 amps and about 800 amps to maintain an average number of plasma instability events are maintained below about 10 events per second, according to some embodiments. According to some other embodiments, applying the current 64 includes applying a peak current between about 400 amps and about 700 amps, between about 500 amps and about 800 amps, or between about 600 amps and about 900 amps.

Additive Manufacturing Methods Using Aluminum-Containing Wires

Additive manufacturing, sometimes referred to as three-dimensional (3D) printing, refers to a manufacturing process in which a three-dimensional object is fabricated by depositing a material, e.g., a metal, in a layer-by-layer fashion from a computer-aided design. Additive manufacturing contrasts with traditional "subtractive" manufacturing, in which excess materials are subtracted, e.g., cut, drilled, and/or ground away, from a solid piece of material. In the disclosed embodiments of additive manufacturing methods, deposition techniques used in welding technologies are utilized. While in traditional welding processes, a joint formed of beads join separate metal pieces to form a weldment, the methods of additive manufacturing according to embodiments comprise forming a plurality of stacked layers of beads that form a substantial portion of an article or a component. While a substrate on which the layers of beads are formed may be part of a final product, the deposited layers of beads substantially form a discrete portion of the product instead of serving primarily as a joint. In some embodiments, the substrate may be sacrificial and the article or the product formed by the layers of beads may be detached therefrom. More in particular, embodiments disclosed herein relate to wire-feed additive manufacturing, in which the layers of beads are formed from molten droplets of metal formed by a suitable energetic process, such as one or more of an electric arc, laser heating, resistive heating and electron beam irradiation.

In part due to less material wastage compared to subtractive manufacturing techniques as well as other additive manufacturing processes, e.g., powder bed fusion processes, the disclosed wire-feed additive manufacturing technologies can be advantageous for fabricating metal components that are relatively large, expensive, have complex geometry, have good surface finish and/or have superior material property to meet the demanding requirements in various applications including aerospace, automotive and tooling industries. Various process parameters including energy input, wire-feed rate, welding speed, deposition pattern and deposition sequences, etc., can be controlled as disclosed herein to manufacture components with excellent mechanical properties and visual appearance.

However, wire-feed additive manufacturing processes face challenge arising in part from relatively high thermal cycling, which can be associated with various process parameters, such as wire feed rate, deposition rate and wire diameter, as well as the deposition pattern and sequences, among others. For example, while wire-feed additive manufacturing processes can advantageously provide a high deposition rate, the high deposition rate can be accompanied by relatively high variability in thermal quench rate of the molten metal. The relatively high variability in thermal quench rage can lead to, among other things, relatively high residual stress, which can cause warpage and deformation.

The inventors have discovered that wire-feed additive manufacturing processes using wires according to embodiments can overcome these and other challenges associated with wire-feed additive manufacturing processes. In particular, by controlling the composition and structure of the aluminum-containing wires disclosed herein, the inventors have discovered that articles fabricated using the welding wires according to embodiments by wire-feed additive manufacturing processes have superior mechanical properties. Without being bound to any theory, the observed improvements including, among other improvements, low porosity, high fracture toughness at low temperatures, high resistance to hot cracking and relatively low deformation, can be due to the wire compositions that lead to a controlled amount of FCC austenite that can be relatively thermal history-independent, thus being relatively more immune to higher levels of variability of thermal quench rate. The superior mechanical properties can be attributed at least in part due to the controlled fraction of FCC austenite in the beads. The inventors have found that the effective amount of FCC austenite can be, e.g., greater than 20%, 30% or 40%, or a percentage in a range defined by these percentages, on the basis of a total volume of the weld beads. Thus, the controlled amount of austenite, when achieved at least in part with a relatively high concentration of aluminum and various other elements in the weld bead as described above, a balance between the various competing technical needs as well as the cost constraints in additive manufacturing can be satisfied.

Based on the foregoing recognition of challenges and the needs for improvement in wire-feed additive manufacturing, embodiments disclosed herein relate wire-feed additive manufacturing methods and systems using aluminum-containing electrodes, e.g., cored electrodes, comprising aluminum (Al) at a concentration between about 3 weight % and about 20 weight % on the basis of the total weight of the welding wire. The articles manufactured by additive manufacturing using the aluminum-containing wires display, among other desirable characteristics, low porosity, high fracture toughness at low temperatures and high resistance to hot cracking.

Figure 7:
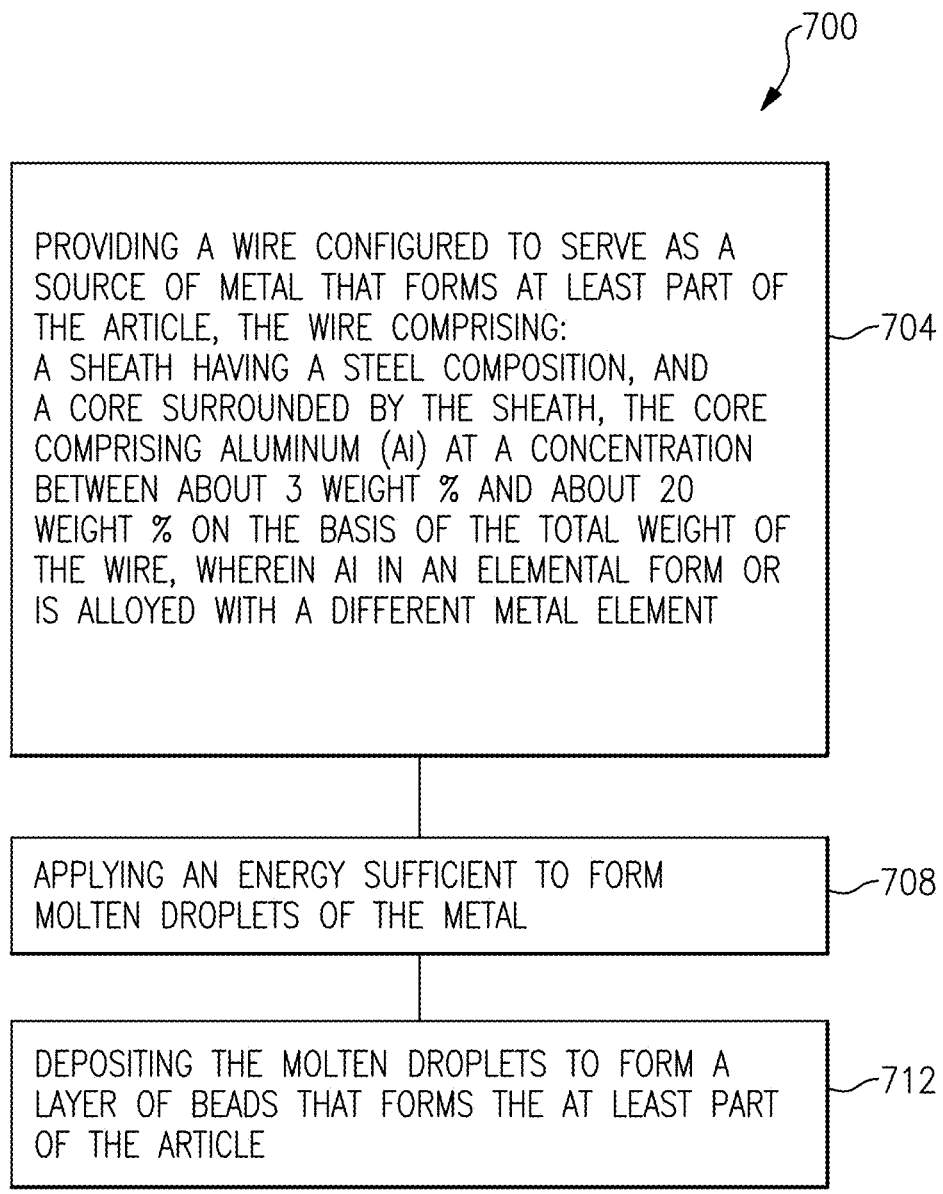
FIG. 7 is a flow chart of a method of fabricating an article by additive manufacturing using an electrode wire comprising aluminum in a core, according to embodiments.

FIG. 7 is a flow chart of a method of fabricating an article by additive manufacturing using an electrode wire comprising aluminum in the core, according to embodiments. The method 700 of fabricating an article by additive manufacturing comprises, according to various embodiments, providing 704 a wire configured to serve as a source of metal to form at least part of the article. The wire comprises, among other things, a sheath having a steel composition, and a core surrounded by the sheath. The core comprises aluminum (Al) at a concentration between about 3 weight % and about 20 weight % on the basis of the total weight of the wire, where Al in an elemental form or is alloyed with a different metal element. The wire can have any configuration and composition described in this application. The method additionally includes applying 708 an energy sufficient to form molten droplets of the metal. The method further includes depositing 712 the molten droplets to form a layer of beads that forms the at least part of the article.

Figure 8A:
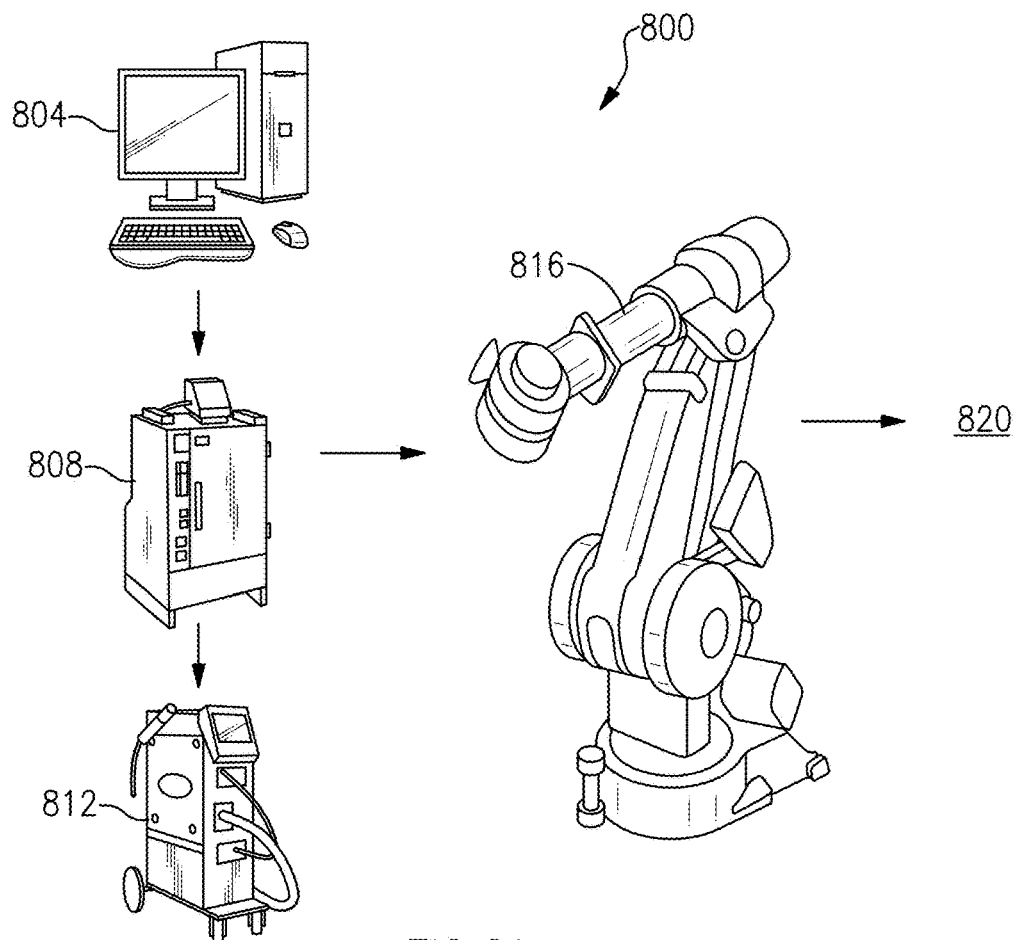
FIGS. 8A and 8B schematically illustrate a system configured for wire-feed additive manufacturing using an electrode wire including aluminum in a core, according to embodiments.
Figure 8B:
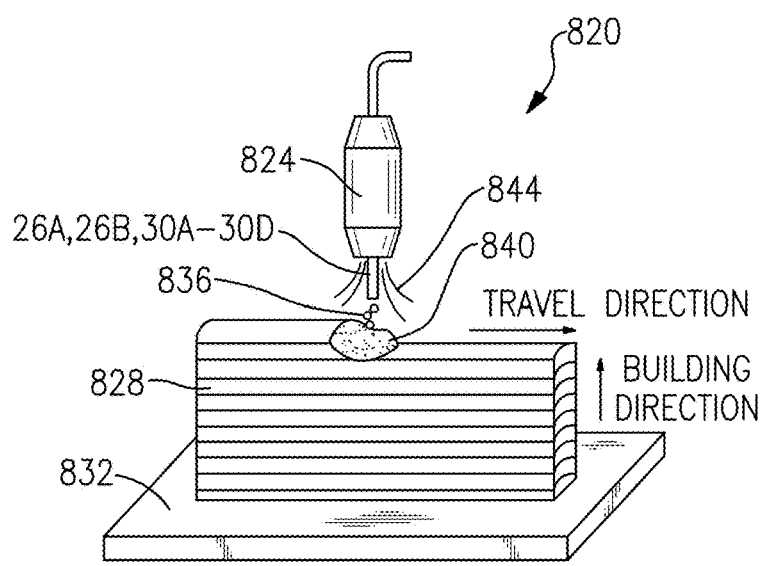

Additive Manufacturing Systems Configured for Methods Using Aluminum-Containing Wires FIGS. 8A and 8B schematically illustrate a system configured for wire-feed additive manufacturing using an electrode wire including aluminum in the core as a source of metal, according to embodiments. The system 800 configured for wire-feed additive manufacturing according to embodiments include a modeling unit 804 comprising a computing device configured to model and to execute a printing code for fabricating the three-dimensional structure of the article to be manufactured, a robot controller 808 configured to coordinate the robot motions and the deposition process, a power source 812 configured to deliver power to a deposition unit 820 to form the molten metal and to control the welding process, and a robot 816 configured to implement the movement of the deposition unit 820 configured to form and deposit the metal droplets and to form the layers of beads.

The modeling unit 804 is equipped with a software for generating a three-dimensional model using, e.g., a CAD design software and for converting the three-dimensional model to a three-dimensional printable code for defining the printing paths as well as start and stop points of the robot 816 and the deposition unit 820 through the robot controller 808 and a wire feeder. The three-dimensional printable code may, for example, generate a plurality of two-dimensional slices that define the three-dimensional structure.

Referring to the deposition unit 820 illustrated in FIG. 8B, in operation, energy sufficient to melt the wire configured according to any embodiment described above (e.g., wires 26A and 26B in FIGS. 2A and 2B, 30A-30D in FIGS. 3A-3D, respectively) is applied thereto, which causes a stream of molten droplets 836 to be formed and be deposited onto the workpiece 828, thereby forming a bead solidified from a molten pool 840. After forming an initial bead on a substrate 832, the robot 816 directs the position of the deposition gun 824 to be translated in a lateral direction for formation of additional beads until a first layer of beads is completed on the substrate 832. Thereafter, the process is repeated until a plurality of layers of beads are formed to fabricated the complete article. The substrate 832 can be part of the final article to be manufactured or be sacrificial. In the latter case, the substrate 832 can be separated such that the entire article is formed by additive manufacturing.

While the deposition unit 820 in the illustrated embodiment depicts an arc-based deposition system, embodiments are not limited thereto. Depending on the energy source used for metal deposition, wire-feed additive manufacturing according embodiments can include the deposition unit 820 that is laser based, arc welding-based or electron beam-based, and a corresponding power source 812, including those described in the following with respect to FIGS. 9A-9C and 10.

Figure 9A:
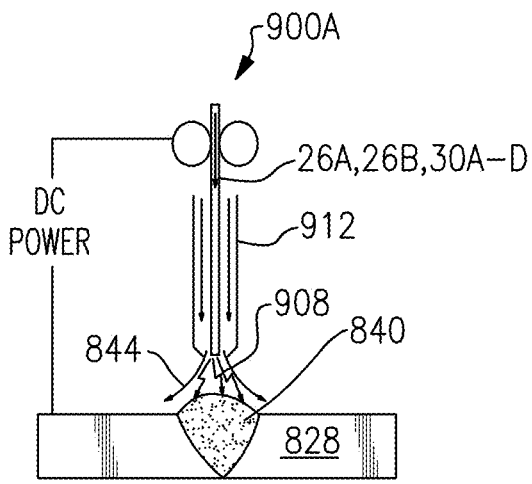
FIG. 9A schematically illustrates a system configured for wire-feed additive manufacturing based on arc welding in which an aluminum-containing electrode wire serves as a source of metal, according to embodiments.

FIG. 9A schematically illustrates a system 900A configured for wire-feed additive manufacturing based on arc welding in which the wire serves both as an electrode and as a source of metal, according to embodiments. The system 800 can be configured for any arc welding process in which an electric arc forms between a consumable electrode wire 26A, 26B, 30A-30D (FIGS. 2A, 2B and 3A-3D, respectively) and the workpiece metal 828. The arc process can transfer the metal to the workpiece 828 based on globular, short-circuiting, spray, pulsed-spray, cold metal transfer (CMT), as well as variants thereof, including controlled dip transfer mode mechanisms, among others. As described above, in these methods, the wire 26A, 26B, 30A-30D according to any embodiment described above (FIGS. 2A, 2B and 3A-3D, respectively) can be used in various arc welding processes, including gas-metal arc welding processes, which may employ either solid electrode wires (GMAW) or metal-cored wires (GMAW-C) as described above. The metal wire can also be used in flux-cored arc welding processes (FCAW), which can be gas shielded flux-cored arc welding (FCAW-G) or self-shielded flux-cored arc welding (FCAW-S) as described above. The inventors have discovered that in some applications, FCAW or FCAW-S processes can be advantageous under some circumstances, e.g., when weld beads are deposited against gravity, the presence of flux (and/or a slag) may be beneficial. The metal wire 26A, 26B, 30A-30D can further be used in shielded metal arc welding (SMAW) processes and submerged arc welding (SAW) processes, among others. The details of each of these processes, which have been described above, are omitted herein for brevity.

The deposition unit 820 can include a deposition gun 824 (FIG. 8B) configured similarly as the welding gun 59 described above with respect to FIGS. 2A, 2B and 5 to deposit weld beads at rates of up to ~30 lbs./hr. or higher for open-arc welding including GMAW, FCAW, FCAW-G, GTAW, SAW, SMAW, or similar arc welding processes that can use a wire comprising an aluminum-containing core, according to embodiments. As described above with respect to FIGS. 2A, 2B and 5, the power source 812 is configured to supply power to the welding system 800 and is electrically coupled to a wire drive (54 in FIG. 5) such that the wire serves as a first electrode, and is further electrically coupled to the workpiece 828 which serves as a second electrode. The wire drive is coupled to the deposition gun 824 and is configured to supply the wire 26A, 26B, 30A-30D from a wire supply (56 in FIG. 5) to the deposition gun 824 during operation of the system 800. In operation, in a similar manner as depositing a weld bead described above with respect to various embodiments, an electric arc is generated between the wire 26A, 26B, 30A-30D and the workpiece 828. Thereafter, a plasma is sustained therebetween, which causes a stream of molten droplets 836 to be formed and deposit onto the workpiece 828, thereby forming a bead solidified from a weld pool 840. After forming an initial bead, the robot 816 directs the position of the deposition gun 824 to be translated in a lateral direction until a first layer of beads is completed. Thereafter, the process is repeated until a plurality of layers of beads are formed to complete the article.

Depending on whether the deposition unit 820 is configured as a FCAW-S system 20A (FIG. 2A) or the FCAW-G system 20B (FIG. 2B), the deposition unit 820 can also include a shielding gas inlet for supplying a shielding gas 844 for delivery to the plasma region thorough a shielding gas nozzle 912.

Figure 9B:
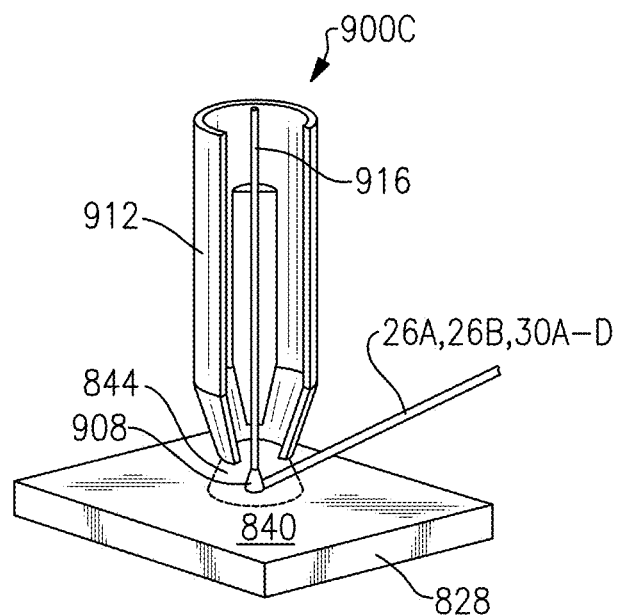
FIG. 9B schematically illustrates a system configured for wire-feed additive manufacturing based on gas tungsten arc welding (GTAW) in which a non-electrode aluminum-containing serves as a source of metal, according to embodiments.
Figure 9C:
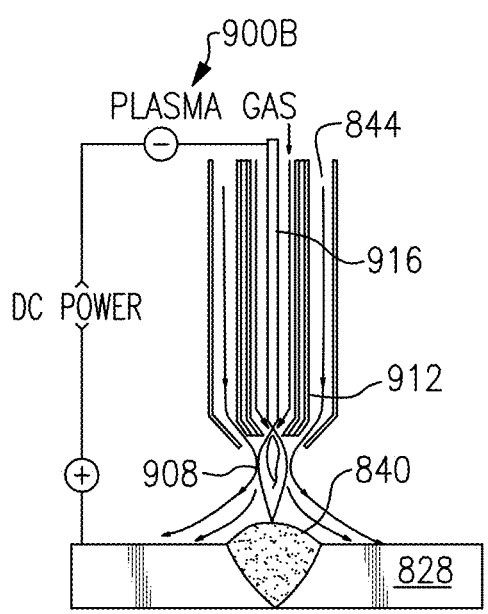
FIG. 9C schematically illustrates a system configured for wire-feed additive manufacturing based on plasma arc welding (PAW) in which an aluminum-containing electrode wire serves as a source of metal, according to embodiments.

FIG. 9B schematically illustrates a system 900B configured for wire-feed additive manufacturing based on gas tungsten arc welding (GTAW), according to embodiments. FIG. 9C schematically illustrates a system configured for wire-feed additive manufacturing based on a related technique of plasma arc welding (PAW), according to embodiments. Various aspects of the systems 900B and 900C that are similar in terms of plasma generation and directing deposition to the system 900A described above are omitted herein for brevity. Unlike the wire-feed additive manufacturing system 900A and methods based on the same in which the wire serves as both an electrode as well as a source of metal, however, in GTAW and PAW, the plasma-generating/sustaining electrode 916 does not serve as a source of metal for the article to be manufactured. Instead, the plasma-generating/sustaining electrode 916 comprises a non-consumable electrode, e.g., tungsten electrode. Therefore, in wire-feed additive manufacturing based on GTAW and PAW, a consumable wire 26A, 26B, 30A-30D (FIGS. 2A, 2B and 3A-3D) is added to the weld pool 840, e.g., a leading edge of the weld pool 840. While GTAW and PAW are similar in these aspects, a difference between them is that in PAW, by positioning the electrode within the body of the deposition gun or the nozzle, the plasma arc can be relatively separated from the shielding gas envelope. As a result, the high temperature zone of the plasma arc is narrower than the GTAW arc, resulting in relatively narrower weld beads that are deposited.

Figure 10:
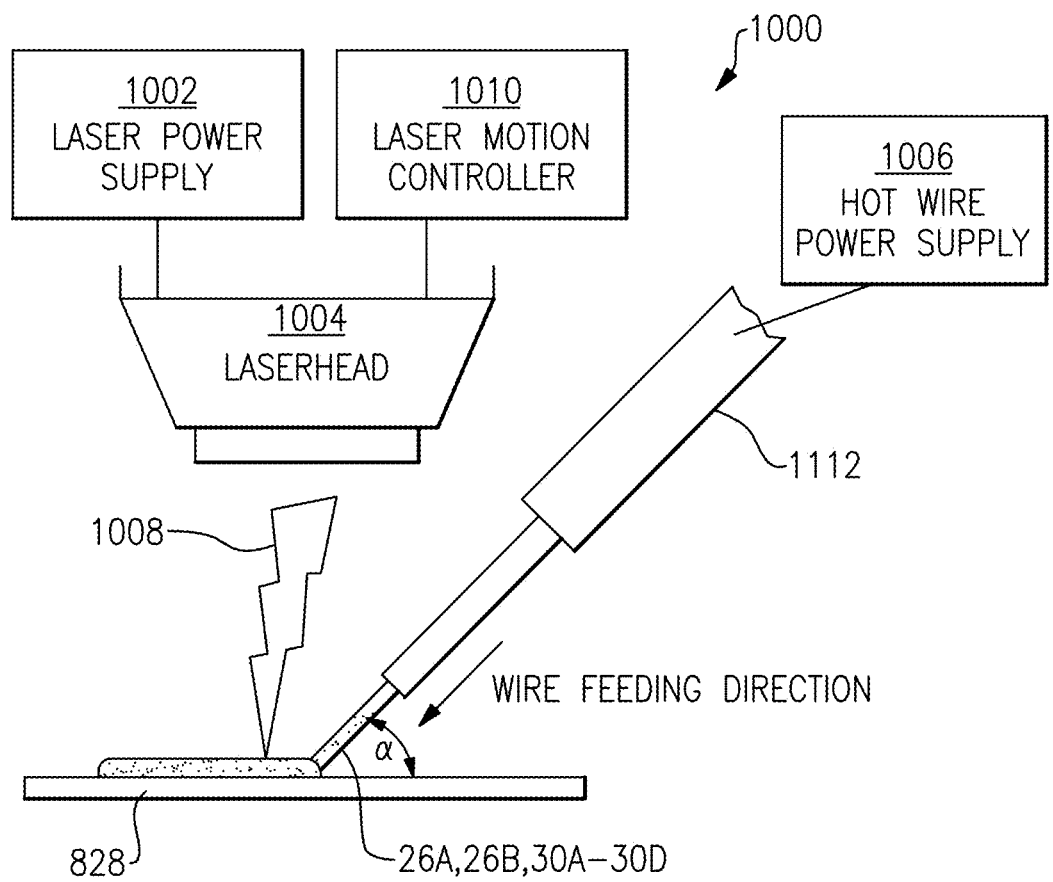
FIG. 10 schematically illustrates a system configured for wire and laser additive manufacturing (WLAM) in which an aluminum-containing wire serves as a source of metal, according to embodiments.

FIG. 10 schematically illustrates a system 1000 configured for wire and laser additive manufacturing (WLAM), according to embodiments. The WLAM is an additive manufacturing process using the metal wire as the additive material and a laser as the energy source to form the molten droplets, instead of a plasma arc. The metal wire according to any embodiment described above (e.g., wires 26A and 26B in FIGS. 2A and 2B, 30A-30D in FIGS. 3A-3D, respectively) can be used.

The system 1000 may be configured for a laser hot wire welding process. As described herein, a laser hot wire welding process refers to a welding process in which a laser beam in conjunction with a resistively heated "hot" welding electrode is used to deposit welding beads. The system 1000 includes a laser subsystem configured to provide energy to a filler wire (26A and 26B in FIGS. 2A and 2B, 30A-30D in FIGS. 3A-3D, respectively), which serves as a source of metal and a workpiece 828. The laser subsystem includes a laser source 1004 powered by a laser power supply 1002. The laser source 1004 is configured to provide energy to the filler wire and/or the workpiece 828 by focusing a laser beam 1008. The laser source 1004 is configured to provide the laser beam 1008 having sufficient energy density to melt the filler wire and/or the workpiece 828, according to embodiments. The laser beam 1008 may be, e.g., a continuous wave (CW), modulated or pulsed, and may have a wavelength in the visible spectrum or the near infrared spectrum, in various embodiments.

In various embodiments, the system 1000 may be further configured to perform one or more of plasma arc welding, gas tungsten arc welding, gas metal arc welding, flux cored arc welding, and submerged arc welding, in addition to hot wire welding.

The system 1000 additionally includes a welding wire feeder 1112 configured to provide, e.g., continuously provide, the filler wire. The welding wire feeder 1112 is configured to direct the wire such that it makes contact with the workpiece 828 in the vicinity of the laser beam 1004.

The illustrated system further comprises a hot wire power supply 1006 (which may be included as part of the power supply 812 in FIG. 8A) configured to provide current, voltage and/or power for resistively heating the filler wire during operation. In some embodiments, the hot wire welding power supply 1006 is a direct current (DC) power supply, e.g., a pulsed DC power supply. However, embodiments are not so limited and in other embodiments, the hot wire power supply 1006 can be an alternating current (AC) or other types of power supplies.

In operation, the filler wire is fed from the wire feeder 1112 and extends toward the workpiece 828. The filler wire may be resistively heated by the current, voltage and/or power delivered by the hot wire power supply 1006 such that the filler wire can approach, reach or exceed the melting temperature of the filler wire. In conjunction, the laser source 1004 is configured to provide a laser beam 1008 having sufficient power density to at least partially cause the base metal of the workpiece 828 to melt to form the weld pool, and/or to at least partially cause the filler wire to melt to form a molten metal at or above the melting temperature, e.g., a superheated metal onto the workpiece 828.

According to embodiments, the hot wire power supply 1006 may be configured to provide at least a portion, e.g., greater than 50%, greater than 60%, greater than 70%, greater than 80%, greater than 90% or a portion within any of these percentage values, of the energy needed to resistively melt the filler wire and/or to form the weld pool. According to embodiments, the laser device 1004, through the laser power supply 1002 (which may be included as part of the power supply 812 in FIG. 8A or a standalone power supply), is configured to provide at least a portion, e.g., greater than 50%, greater than 60%, greater than 70%, greater than 80%, greater than 90% or a portion within any of these percentage values, of the energy needed to resistively melt the filler wire and/or to form the weld pool.

Still referring to FIG. 10, the system 1000A may further include a laser motion controller 1010 configured to move the laser beam 1008 independently from the wire feeder 1112 as part of the deposition unit 820 (FIGS. 8A and 8B). For example, the laser motion controller 1010 may be configured to move the laser beam 1008 in the same direction along the workpiece 828 as the filler wire and at a fixed distance such that the laser beam 1004 and the filler wire remain in a relatively fixed relation to each other, while forming welding beads along the same direction. Alternatively, the laser device 1004 and the wire feeder 1112 may be integrated as a single moving part that may be moved along the workpiece 828 via the motion control system described above with respect to FIG. 8B. Additional details of laser hot wire welding processes and systems that may be relevant are described in, for example, U.S. 8,653, 417, the content of which is incorporated herein in its entirety.

While certain embodiments have been described herein, these embodiments have been presented by way of example only and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A method of fabricating an article by additive manufacturing, the method comprising:
    providing a wire configured to serve as a source of metal that forms an entire article, the wire comprising:
        a sheath having a steel composition, and
        a core surrounded by the sheath, the core comprising aluminum (Al) at a concentration between 3 weight % and 20 weight % on the basis of the total weight of the wire,
        wherein the wire comprises carbon (C), manganese (Mn) and nickel (Ni), wherein [Ni]<10 weight % and a nickel equivalent defined by 2[Mn]+[Ni]+30[C] >30 weight %, wherein [Mn], [Ni] and [C] represent weight percentages of respective elements on the basis of the total weight of the wire, and
        wherein the Al is in an elemental form or is alloyed with a different metal element in the wire;
    applying an energy sufficient to form molten droplets of the metal; and
    depositing the molten droplets to form a plurality of layers of beads in a layer-by-layer fashion to fabricate the entire article by three-dimensional printing, wherein the entire article incorporates the Al as an alloying element.

2. The method of fabricating the article according to claim 1, wherein depositing the molten droplets comprises forming a plurality of stacked layers of beads that form a substantial portion of the article.

3. The method of fabricating the article according to claim 1, wherein applying the energy comprises applying energy sufficient to generate a plasma arc between the wire and a workpiece to cause the formation of the molten droplets.

4. The method of fabricating the article according to claim 1, wherein applying the energy comprises resistively heating the wire while directing a laser beam over a workpiece to cause the formation of the molten droplets.

5. The method of fabricating the article according to claim 1, wherein the method comprises applying the energy and depositing according to a gas metal arc welding (GMAW) process.

6. The method of fabricating the article according to claim 1, wherein the method comprises applying the energy and depositing according to a self-shielded flux-cored arc-welding (FCAW-S) process without a shielding gas.

7. The method of fabricating the article according to claim 1, wherein the method comprises applying the energy and depositing according to a gas tungsten arc welding (GTAW) process or a plasma arc welding (PAW) process in which applying the energy comprises applying the energy to an electrode that is different than the wire.

8. The method of fabricating the article according to claim 1, wherein providing the wire comprises providing a metal-cored wire.

9. The method of fabricating the article according to claim 1, wherein providing the wire comprises providing a self-shielded flux-cored arc welding (FCAW-S) wire, wherein the core comprises a fluxing agent comprising an oxide of a metal other than Al or Mn or a fluoride of a metal other than Al or Mn.

10. The method of fabricating the article according claim 1, wherein the core comprises manganese (Mn) at a concentration between 10 weight % and 60 weight % on the basis of the total weight of the wire, wherein Mn is in an elemental form or is alloyed with a different metal element.

11. The method of fabricating the article according claim 10, wherein the core further comprises one or more of:
    copper (Cu) at a concentration greater than zero weight % and less than 10 weight % on the basis of the total weight of the wire; and
    cobalt (Co) at a concentration greater than zero weight % and less than 10 weight % on the basis of the total weight of the wire,
    wherein a total concentration of the one or more of Cu and Co is greater than zero weight % and less than 10 weight % on the basis of the total weight of the wire.

12. The method of fabricating the article according claim 1, wherein the wire comprises one or more of:
    nickel (Ni) at a concentration greater than zero weight % and less than 50 weight % on the basis of the total weight of the wire;
    carbon (C) at a concentration greater than zero weight % and less than 2.5 weight % on the basis of the total weight of the wire; and
    nitrogen (N) at a concentration greater than zero weight % and less than 2 weight % on the basis of the total weight of the wire.

13. The method of fabricating the article according claim 1, wherein the wire further comprises N, Cu and Co at respective concentrations such that 2[Mn]+[Ni]+30[C]+20[N]+0.3[Cu]+0.3[Co] is between 10 weight % and 80 weight %, wherein [Mn], [Ni], [C], [N], [Cu] and [Co] represent weight percentages of respective elements on the basis of the total weight of the wire.

14. The welding wire of claim 1, wherein the Al is present at a concentration between 4 weight % and 6.5 weight %, the [Mn] is between 18 weight % and 25 weight % and the nickel equivalent is present at a concentration of 30 to 50 weight %.

15. The welding wire of claim 14, wherein the concentration of Ni is between 2 weight % and 10 weight %.

16. The welding wire of claim 14, wherein within respective ranges of Al and the nickel equivalent, an amount of BCC phase present in the layers of beads is proportional to the concentration of Al while being inversely proportional to the concentration of the nickel equivalent.

17. A method of fabricating an article by additive manufacturing, the method comprising:
    providing a wire configured to serve as a source of metal that forms an entire article, the wire comprising a core surrounded by a sheath and a composition such that beads formed by quenching molten droplets formed by melting the wire has a bead composition including, on the basis of a total weight of the beads, iron (Fe) at a concentration between 50 weight % and 85 weight %, aluminum (Al) at a concentration between 3 weight % and 20 weight %, carbon (C), manganese (Mn) and nickel (Ni), wherein [Ni]<10 weight % and a nickel equivalent defined by 2[Mn]+[Ni]+30[C] >30 weight %, and wherein [Mn], [Ni] and [C] represent weight percentages of respective elements; and depositing molten droplets formed from the wire to form a plurality of layers of the beads in a layer-by-layer fashion to fabricate the entire article by three-dimensional printing, wherein the entire article incorporates the Al as an alloying element.

18. The method of fabricating the article according to claim 17, further comprising applying an energy sufficient to generate a plasma arc between the wire and a workpiece to cause the formation of the molten droplets.

19. The method of fabricating the article according to claim 17, further comprising resistively heating the wire while directing a laser beam over a workpiece to cause the formation of the molten droplets.

20. The method of fabricating the article according claim 17, wherein the beads comprise manganese (Mn) at a concentration between 10 weight % and 60 weight %, on the basis of the total weight of the beads.

21. The method of fabricating the article according to claim 17, wherein the beads have aluminum (Al) at a concentration between 4 weight % and 6.5 weight % and manganese (Mn) at a concentration between 15 weight % and 25 weight % on the basis of the total weight of the beads.

22. The method of fabricating the article according claim 17, wherein the beads have face-centered cubic (FCC) austenite exceeding 30% on the basis of a total volume of the beads.

23. The method of fabricating the article according claim 17, wherein the core comprises:
aluminum (Al) at a concentration between 8 weight % and 20 weight % on the basis of a total weight of the wire;
manganese (Mn) at a concentration between 30 weight % and 60 weight % on the basis of the total weight of the wire; and
nickel (Ni) at a concentration greater than zero weight % and less than 50 weight % on the basis of the total weight of the wire,
wherein each of Al, Mn and Ni is in an elemental form or is alloyed with a different metal element.

* * * * *